(12) United States Patent
Honma

(10) Patent No.: US 8,151,049 B2
(45) Date of Patent: Apr. 3, 2012

(54) INPUT/OUTPUT CONTROL UNIT, DISK ARRAY APPARATUS, INPUT/OUTPUT CONTROL METHOD, AND PROGRAM

(75) Inventor: Kazuya Honma, Tokyo (JP)

(73) Assignee: NEC Corporation, Tokyo (JP)

( * ) Notice: Subject to any disclaimer, the term of this patent is extended or adjusted under 35 U.S.C. 154(b) by 592 days.

(21) Appl. No.: 12/354,636

(22) Filed: Jan. 15, 2009

(65) Prior Publication Data

US 2009/0187706 A1 Jul. 23, 2009

(30) Foreign Application Priority Data

Jan. 17, 2008 (JP) ................ 2008-007618

(51) Int. Cl.
G06F 13/00 (2006.01)
G06F 13/28 (2006.01)
G06F 15/173 (2006.01)
G06F 11/00 (2006.01)

(52) U.S. Cl. ............... 711/114; 711/E12.002; 709/239; 714/43; 714/4.12

(58) Field of Classification Search .............. 711/114, 711/E12.002; 709/239; 714/43, 4.12
See application file for complete search history.

(56) References Cited

U.S. PATENT DOCUMENTS 7,941,655 B1 * 5/2011 Kaul et al. ................ 713/1
2002/0023151 A1 * 2/2002 Iwatani ..................... 709/223
2004/0068591 A1 * 4/2004 Workman et al. ........... 710/58
2005/0083853 A1 * 4/2005 Rooney et al. ............. 370/252
2006/0117211 A1 * 6/2006 Matsunami et al. ......... 714/4

FOREIGN PATENT DOCUMENTS

| JP | 61-208140 A | 9/1986 |
| JP | 4-195354 A | 7/1992 |
| JP | 1998-312301 A | 11/1998 |
| JP | 2001024673 A | 1/2001 |
| JP | 2005-004791 A | 1/2005 |
| JP | 2007146633 A | 6/2006 |
| JP | 2007219717 A | 8/2007 |
| JP | 2007-272702 A | 10/2007 |

OTHER PUBLICATIONS

Japanese Office Action for JP2008-007618 issued Dec. 15, 2009.

* cited by examiner

*Primary Examiner* — Edward Dudek, Jr.

(57) ABSTRACT

An input/output controller, including: a first/a second input/output units that sends and receives data to and from a first and a second external apparatus, a third input/output unit operating in one of a plurality of working modes including a first/a second working mode for sending and receiving data to and from the first/the second external apparatus, an abnormal state detecting unit which detects that the first input/output unit or the second input/output unit is in an abnormal state and a working mode setting unit which makes the third input/output unit operate in the first/the second working mode when it is detected that the first/the second input/output unit is in an abnormal state.

24 Claims, 22 Drawing Sheets

Fig.4

241 ADAPTER ATTRIBUTE INFORMATION TABLE

| ADAPTER ID | WORKING MODE | CLUSTER ID |
|---|---|---|
| #1 | HOST-MODE | #1 |
| #2 | DISK-MODE | #1 |
| #3 | SPARE-MODE | #1 |
| #4 | HOST-MODE | #2 |
| #5 | DISK-MODE | #2 |
| #6 | SPARE-MODE | #2 |

Fig.10

241 ADAPTER ATTRIBUTE INFORMATION TABLE

| ADAPTER ID | WORKING MODE | CLUSTER ID |
|---|---|---|
| #1 | SPARE-MODE | #1 |
| #2 | DISK-MODE | #1 |
| #3 | HOST-MODE | #1 |
| #4 | HOST-MODE | #2 |
| #5 | DISK-MODE | #2 |
| #6 | SPARE-MODE | #2 |

Fig.12

241 ADAPTER ATTRIBUTE INFORMATION TABLE

| ADAPTER ID | WORKING MODE | CLUSTER ID |
|---|---|---|
| #1 | HOST-MODE | #1 |
| #2 | SPARE-MODE | #1 |
| #3 | DISK-MODE | #1 |
| #4 | HOST-MODE | #2 |
| #5 | DISK-MODE | #2 |
| #6 | SPARE-MODE | #2 |

Fig.19

241 ADAPTER ATTRIBUTE INFORMATION TABLE

| ADAPTER ID | WORKING MODE | CLUSTER ID |
|---|---|---|
| #1 | SPARE-MODE | #1 |
| #2 | SPARE-MODE | #2 |
| #3 | HOST-MODE | #1 |
| #4 | HOST-MODE | #2 |
| #5 | DISK-MODE | #2 |
| #6 | DISK-MODE | #1 |

INPUT/OUTPUT CONTROL UNIT, DISK ARRAY APPARATUS, INPUT/OUTPUT CONTROL METHOD, AND PROGRAM

This application is based upon and claims the benefit of priority from Japanese Patent Application No. 2008-007618 filed on Jan. 17, 2008, the disclosure of which is incorporated herein in its entirety by reference.

1. Technical Field

The present invention relates to an input/output control unit which sends and receives data to and from an external apparatus, a disk array apparatus, an input/output control method and a program.

2. Background Art

An input/output control unit (for example, disk array controller which controls a disk array unit) connected to a host device and a disk array unit is known. This input/output control unit includes a first input/output unit which sends and receives data to and from a host device by being connected with the host device and a second input/output unit that sends and receives data to and from a disk array unit by being connected with the disk array unit.

By such configurations, an input/output control unit receives data from one of the host device and the disk array unit and sends received data to the other of the host device and the disk array unit.

As one of this kind of input/output control units, an input/output control unit described in patent document 1 further includes a third input/output unit connected with the host device in order to send and receive data to and from the host device a fourth input/output unit connected with the disk array unit in order to send and receive data to and from the disk array unit.

Accordingly, according to this input/output control unit, even when first input/output unit is in an abnormal state (a failure occurs), data can be sent and received to and from the host device by using the third input/output unit. Even when the second input/output unit is in an abnormal state, this input/output control unit can send and receive data to and from the disk array unit by using the fourth input/output unit.

Thus, according to this input/output control unit, when whichever of the first input/output unit and the second input/output unit is in an abnormal state, both of data send and receive of to and from the disk apparatus and data send and receive to and from the host device can be maintained (redundancy is secured).

As another related technology, there is a disk array subsystem described in patent document 2. This disk array subsystem includes a plurality of JBOD (Just a Bunch Of Disks), an adapter circuit and a disk array controller. The JBOD includes a plurality of HDDs (Hard Disk Drive) and a PBC (Port Bypass Circuit) circuit which performs driving control of each of these HDDs and which is configured redundantly. The adapter circuit corresponds to each of the JBODs separately, and is installed with a redundant configuration side by side with each of the JBODs, and sends a predetermined operation control signal to each of the P3C circuits at the time of reading and writing of information in the HDDs. The above mentioned disk array controller controls operation of redundantly configured at least two HDD control systems, each of which including the PBC circuit and the adapter circuit, individually.

Thus, even at the time of occurrence of a failure of the adapter circuit installed side by side to the JBOD and also at the time of a change thereof, for example, such configured disk array subsystem can build an alternative route by evading the adapter circuit concerned. Accordingly, a path which accesses HDD can be made operate very similarly with a normal case, while maintaining a redundant configuration to the HDD substantially.

As another related technology, there is an information processing apparatus described in patent document 3. This information processing apparatus includes a plurality of duplicated control adapters, a state table for setting a state of the control adapters, and a failure detection means and an adapter switching means. Each half of the duplicated control adapter is installed separately in adapter blocks A and B, and operates as legitimacy/duplicate. The state table holds one of states of the legitimacy/duplicate/failure that it has been set as a current state of each control adapter. The failure detection control means detects a failure of the control adapter during operation of the apparatus, performs switching of the control adapter concerned, and updates the state table to the current state. When the state table is checked at off-line timing and only one adapter block of the systems breaks down, the adapter switching means changes all control adapters except for the broken adapter in the adapter block to the duplicate system and changes all control adapters in the other adapter block to the legitimacy.

An information processing apparatus which is constructed in such a way can make all control adapters of an adapter block which is not in a failure state legitimacy at the first off-line timing after the breakdown of the control adapter occurs. Accordingly, it is possible to perform maintenance of an adapter block including a failed control adapter without influencing operation during the next operation session.

[Patent document 1] Japanese Patent Application Laid-Open No. 2005-004791

[Patent document 2] Japanese Patent Application Laid-Open No. 2007-272702

[Patent document 3] Japanese Patent Application Laid-Open No. 1998-312301

SUMMARY

An exemplary object of the invention is to provide an input/output control unit, a disk array apparatus and an input/output control method capable of settling a problem that a cost performance ratio of an input/output unit which is provided in order to secure redundancy is low.

An input/output controller according to an exemplary aspect of the invention includes a first input/output unit that sends and receives data to and from a first external apparatus, a second input/output unit that sends and receives data to and from a second external apparatus, a third input/output unit that operates in one of a plurality of working modes including a first working mode for sending and receiving data to and from the first external apparatus and a second working mode for sending and receiving data to and from the second external apparatus, an abnormal state detecting unit that detects that the first input/output unit or the second input/output unit is in an abnormal state and a working mode setting unit that makes the third input/output unit operate in the first working mode when it is detected by the abnormal state detecting unit that the first input/output unit is in an abnormal state, and makes the third input/output unit operate in the second working mode when it is detected by the abnormal state detecting unit that the second input/output unit is in an abnormal state.

A disk array apparatus according to an exemplary aspect of the invention includes a first input/output unit that sends and receives data to and from a disk array unit, a second input/output unit that sends and receives the data to and from a host device, a third input/output unit that operates in one of a plurality of working modes including a first working mode for sending and receiving data to and from the disk array unit and a second working mode for sending and receiving data to and from the host device, an abnormal state detecting unit which detects that the first input/output unit or the second input/output unit is in an abnormal state and a working mode setting unit which makes the third input/output unit operate in the first working mode when it is detected by the abnormal state detecting unit that the first input/output unit is in an abnormal state, and on the other hand, makes the third input/output unit operate in the second working mode when it is detected by the abnormal state detecting unit that the second input/output unit is in an abnormal state.

An input/output control method for controlling an input/output control unit which includes a first input/output unit that sends and receives data to and from a first external apparatus and a second input/output unit that sends and receives data to and from a second external apparatus, and which receives data from one of the first external apparatus and the second external apparatus, and sends the data received to the other of the first external apparatus and the second external apparatus detecting that the first input/output unit or the second input/output unit is in an abnormal state, making a third input/output unit operate in a first working mode in which data is transferred to and from the first external apparatus, when it is detected that the first input/output unit is in an abnormal state and making the third input/output unit operate in a second working mode in which data is transferred to and from the second external apparatus, when it is detected by the abnormal state detecting step that the second input/output unit is in an abnormal state.

A computer readable medium embodying a program according to an exemplary aspect of the invention, the program causing an input/output control unit which comprises a first input/output unit which sends and receives data to and from a first external apparatus and a second input/output unit that sends and receives data to and from a second external apparatus, and which receives data from one of the first external apparatus and the second external apparatus, and sends the data received to the other of the first external apparatus and the second external apparatus to perform a method, the method includes detecting that the first input/output unit or the second input/output unit is in an abnormal state, making a third input/output unit operate in a first working mode in which data is transferred to and from the first external apparatus, when it is detected that the first input/output unit is in an abnormal state and making the third input/output unit operate in a second working mode in which data is transferred to and from the second external apparatus, when it is detected by the abnormal state detecting step that the second input/output unit is in an abnormal state.

An input/output controller according to an exemplary aspect of the invention includes a first input/output means for sending and receiving data to and from a first external apparatus, a second input/output means for sending and receiving data to and from a second external apparatus, a third input/output means for operating in one of a plurality of working modes including a first working mode for sending and receiving data to and from the first external apparatus and a second working mode for sending and receiving data to and from the second external apparatus, an abnormal state detecting means for detecting that the first input/output means or the second input/output means is in an abnormal state and a working mode setting means for making the third input/output means operate in the first working mode when it is detected by the abnormal state detecting means that the first input/output means is in an abnormal state, and making the third input/output means operate in the second working mode when it is detected by the abnormal state detecting means that the second input/output means is in an abnormal state.

BRIEF DESCRIPTION OF THE DRAWINGS

Exemplary features and advantages of the present invention will become apparent from the following detailed description when taken with the accompanying drawings in which:

FIG. 4 is a table which includes a plurality of adapter attribute information including adapter ID, a working mode and a cluster ID;

FIG. 10 is a table which includes a plurality of adapter attribute information including adapter ID, a working mode and a cluster ID;

FIG. 12 is a table which includes a plurality of adapter attribute information including adapter ID, a working mode and a cluster ID;

FIG. 19 is a table which includes a plurality of adapter attribute information including adapter ID, a working mode and a cluster ID;

EXEMPLARY EMBODIMENT

Next, the first exemplary embodiment of an input/output control unit and a disk array apparatus using an input/output control method will be described in detail with reference to FIGS. 1-13.

Figure 1:
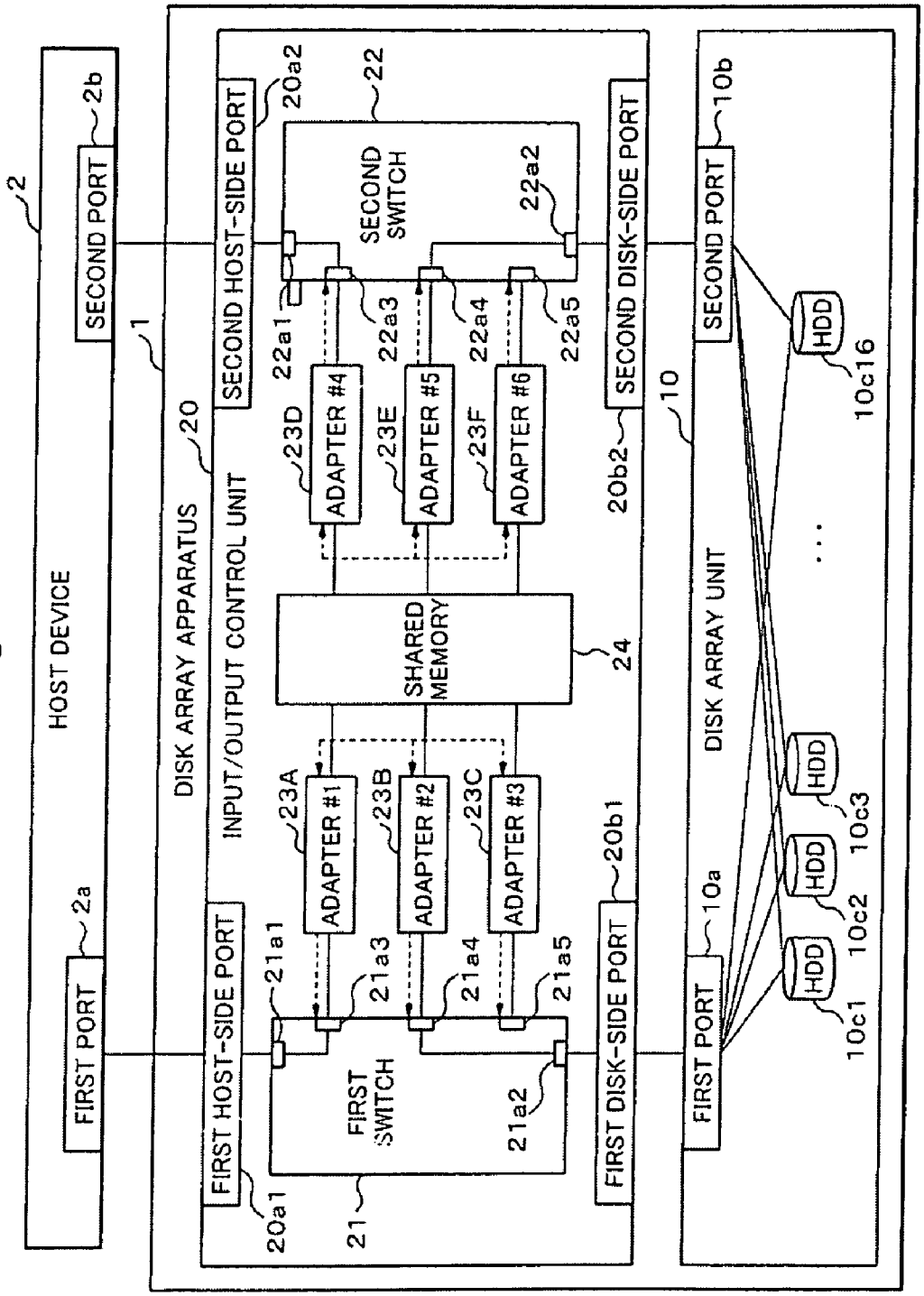
FIG. 1 is an exemplary block diagram showing the configuration of a disk array apparatus and a host device according to a first exemplary embodiment.

As shown in FIG. 1, disk array apparatus 1 according to the first exemplary embodiment is connected with host device (it is also generally referred to as a first external apparatus) 2.

Host device 2 includes, for example, a central processing unit (not shown), a memory unit (not shown), a communication device (not shown) and an interface unit (not shown) which are connected each other via a bus which is not illustrated. The communication device is connected with a plurality of terminal devices (not shown) via a communication line which is not illustrated and sends and receives data to and from those terminal devices. The interface unit includes first port 2a and second port 2b for sending and receiving data to and from input/output control unit 20 of disk array apparatus 1 which will be described later.

Host device 2 generates write data based on data from a terminal device and sends (outputs) write request information including generated write data to disk array apparatus 1. The write request information further includes, in addition to the write data, write file information representing a write file (a file name including the path from a root directory, for example) in a file system and request information representing that there is a request to write the write data in the write file.

On the other hand, host device 2 sends read request information to disk array apparatus 1 based on data from a terminal device. Here, the read request information includes read file information representing a read file (the file name including the path from a root directory, for example) in the file system and request information representing that there is a request to read in (read) data included in the read file. Moreover, host device 2 receives (inputs) read completion information which is information including read data, and which is information sent from disk array apparatus 1 according to the read request information.

Disk array apparatus 1 is an apparatus which a RAID (Redundant Arrays of Inexpensive Disks) includes. Disk array apparatus 1 includes a disk array unit (it is also generally called a second external apparatus) 10 and input/output control unit 20.

Disk array unit 10 includes an interface unit including first port 10a and second port 10b for sending and receiving data to and from input/output control unit 20. Further, disk array unit 10 includes a plurality of (sixteen in this exemplary embodiment, for example) HDDs (hard disk drive) 10c1-10c16. Respective HDDs 10c1-10c16 are connected with each of first port 10a and second port 10b.

Disk array unit 10 receives write instruction information from input/output control unit 20 via first port 10a or second port 10b. Here, write instruction information includes individual disk write area information representing a write area (such as a sector, for example) of each of HDDs 10c1-10c16, and individual disk write data for each of HDDs 10c1-10c16.

Disk array unit 10 stores data in each of HDDs 10c1-10c16 based on received write instruction information. Specifically, disk array unit 10 causes HDDs 10c1-10c16 to memorize (store or write) individual disk write data for each of HDDs 10c1-10c16 in a write area of each of HDDs 10c1-10c16 indicated by the individual disk write area information.

Disk array unit 10 receives read instruction information from input/output control unit 20 via first port 10a or second port 10b. Here, read instruction information includes individual disk read area information representing a read area (such as a sector, for example) of each of HDDs 10c1-10c16.

Disk array unit 10 reads (reads out) each individual disk read data from each of HDDs 10c1-10c16 based on the received read instruction information. Specifically, disk array unit 10 reads, in a read area of each of HDDs 10c1-10c16 indicated by the individual disk read area information, individual disk write data memorized (stored) in each of HDDs 10c1-10c16 as the individual disk read data.

Disk array unit 10 sends (outputs) an individual disk read completion information including the individual disk read data read from each of HDDs 10c1-10c16 to input/output control unit 20.

Input/output control unit 20 includes an interface unit including first host-side port 20a1, first disk-side port 20b1, second host-side port 20a2 and second disk-side port 20b2. First host-side port 20a1 is connected with first port 2a of host device 2. Second host-side port 20a2 is connected with second port 2b of host device 2. First disk-side port 20b1 is connected with first port 10a of disk array unit 10. Second disk-side port 20b2 is connected with second port 10b of disk array unit 10.

The interface unit sends and receives data to and from host device 2 via first host-side port 20a1 or second host-side port 20a2. Moreover, the interface unit sends and receives data to and from disk array unit 10 via first disk-side port 20b1 or second disk-side port 20b2.

Further, input/output control unit 20 includes first switch 21, second switch 22, a plurality of (in this exemplary embodiment, six, for example) adapters (it is also called the input/output unit) 23A-23F and shared memory 24.

First switch 21 includes a plurality of (in this exemplary embodiment, five, for example) terminals 21a1-21a5. First switch 21 replies to a connection instruction signal from adapters 23A-23C to connect two optional terminals among terminals 21a1-21a5 electrically. On the other hand, first switch 21 replies to a release indication signal from adapters 23A-23C and releases (cuts off) a connection between the connected two terminals.

Further, second switch 22 also includes a plurality of (in this exemplary embodiment, five, for example) terminals 22a1-22a5 like first switch 21. Second switch 22 also replies to a connection instruction signal to connect two terminals, and replies to a release instruction signal to release a connection between connected two terminals like first switch 21.

Figure 2:
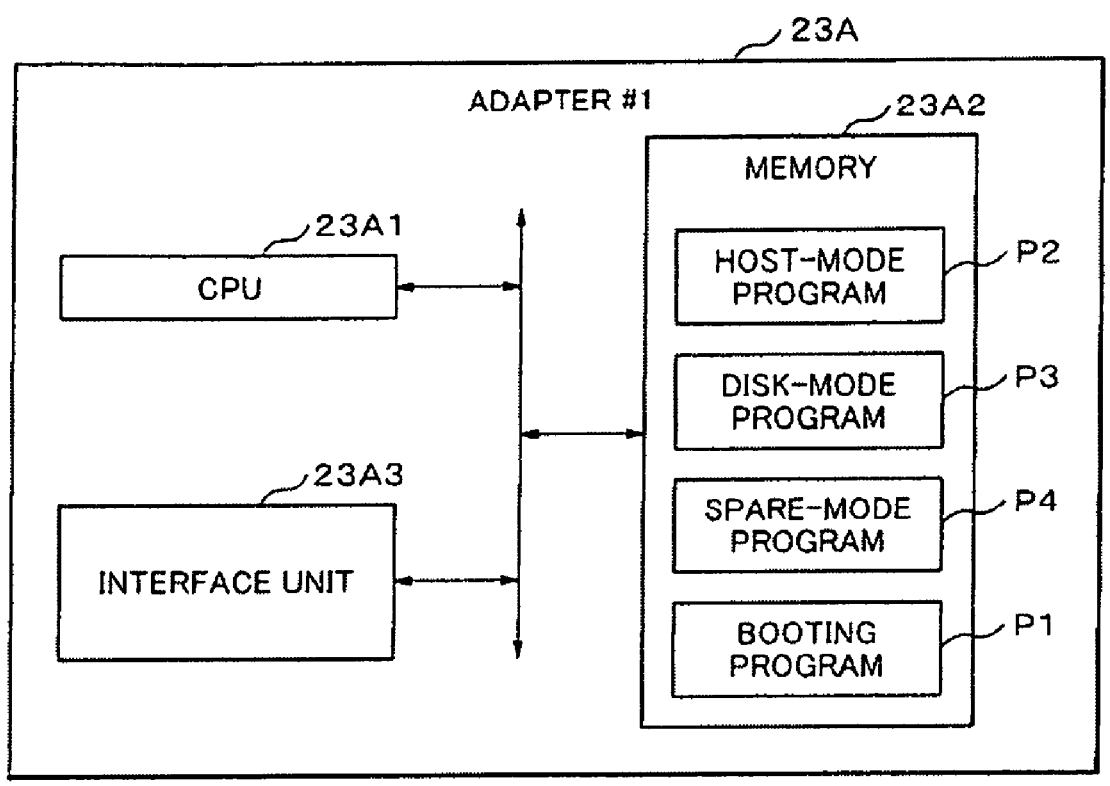
FIG. 2 is a drawing illustrating the schematic configuration of the adapter shown in FIG. 1.

As shown in FIG. 2, adapter 23A includes CPU 23A1, memory 23A2 and interface unit 23A3 connected each other via a bus.

Booting program P1, host-mode program P2, disk-mode program P3, spare-mode program P4 including each program shown in FIGS. 3 and 5-9 which will be mentioned later are recorded (stored) in memory 23A2 in advances.

Interface unit 23A3 is connected with each of terminal 21a3 of first switch 21 and shared memory 24. As a result, interface unit 23A3 sends and receives data (including an instruction signal, request information and instruction information and the like) to and from each of terminal 21a3 of first switch 21 and shared memory 24.

Interface unit 23A3 is also connected with each of an adapter 23B and an adapter 23C in order to sends a state confirmation signal and receives a state response signal.

Moreover, when a state confirmation signal is received from adapter 23B or adapter 23C, adapter 23A transmits a state response signal to an adapter which is the sender of the state confirmation signal immediately.

Each of adapters 23B-23F also includes the same configurations as adapter 23A. Adapter 23B is connected with each of terminal 21a4 of first switch 21 and shared memory 24 in order to send and receive data. Adapter 23B is also connected with each of adapter 23A and adapter 23C in order to send a state confirmation signal and receive a state response signal.

Similarly, adapter 23C is connected with each of terminal 21a5 of first switch 21 and shared memory 24 in order to send and receive data. Adapter 23C is connected with each of adapter 23A and adapter 23B in order to send a state confirmation signal and receive a state response signal.

Similarly, adapter 23D is connected with each of terminal 22a3 of second switch 22 and shared memory 24 in order to send and receive data. Adapter 23D is connected with each of adapter 23E and adapter 23F in order to send a state confirmation signal and receive a state response signal.

Similarly, adapter 23E is connected with each of terminal 22a4 of second switch 22 and shared memory 24 in order to send and receive data. Adapter 23E is connected with each of adapter 23D and adapter 23F in order to send a state confirmation signal and receive a state response signal.

Similarly, adapter 23F is connected with each of terminal 22a5 of second switch 22 and shared memory 24 in order to send and receive data. Adapter 23F is connected with each of adapter 23D and adapter 23E in order to send a state confirmation signal and receive a state response signal.

Further, to each of adapter 23A-23F, adapter IDs #1-#6 as the information which identifies an adapter is attached in this order.

Shared memory 24 stores data from each of adapters 23A-23F and the stored data is sent to each of adapters 23A-23F.

Further, first host-side port 20a1, first switch 21, adapters 23A-23C and first disk-side port 20b1 are included in first cluster CL1. Second host-side port 20a2, second switch 22, adapter 23D-23F and second disk-side port 20b2 are included in second cluster CL2. Moreover, cluster ID #1 as the information for identifying a cluster is appended to first cluster CL1, and cluster ID #2 is appended to second cluster CL2.

Next, the outline of operation of disk array apparatus 1 mentioned above will be described.

First, disk array apparatus 1 sets the connection state of first switch 21 to a connection state where first host-side port 20a1 and adapter 23A are connected, and also first disk-side port 20b1 and adapter 23B are connected. Moreover, disk array apparatus 1 makes adapter 23A operate in a host mode and makes adapter 23B operate in a disk mode.

Then, host device 2 sends write data to disk array apparatus 1 via first port 2a. Disk array apparatus 1 sends the write data from host device 2 to disk array unit 10 through adapter 23A, shared memory 24 and adapter 23B in this order. Disk array unit 10 stores the received write data. On the other hand, disk array unit 10 sends write data which is stored to host device 2 as read data through adapter 23B, shared memory 24 and adapter 23A in this order, according to the request from host device 2.

Moreover, disk array apparatus 1 makes adapter 23C operate in a spare mode. Adapter 23C is configured to detect that adapter 23A or adapter 23B is in an abnormal state.

When adapter 23C detects that adapter 23A is in an abnormal state, disk array apparatus 1 releases the connection of first host-side port 20a1 and adapter 23A. Also, disk array apparatus 1 set the connection state of first switch 21 to a connection, state where first host-side port 20a1 and adapter 23C are connected. Moreover, disk array apparatus 1 makes adapter 23C operate in the host mode.

On the other hand, when adapter 23C detects that adapter 23B is in an abnormal state, disk array apparatus 1 releases the connection of first disk-side port 20b1 and adapter 23B. Also, disk array apparatus 1 set the connection state of first switch 21 to a connection state where first disk-side port 20b1 and adapter 23C are connected. Moreover, disk array apparatus 1 makes adapter 23C operate in the disk mode.

As a result, adapter 23C can send and receive data to and from an external apparatus (in this exemplary embodiment, host device 2 or disk array unit 10) which has been sending and receiving data to and from an adapter which is in an abnormal state.

Further, when host device 2 sends data to disk array apparatus 1 via second port 2b, second cluster CL2 is used. Second cluster CL2 also operates like first cluster CL1.

Next, details of operation of disk array apparatus 1 mentioned above will be described.

Figure 3:
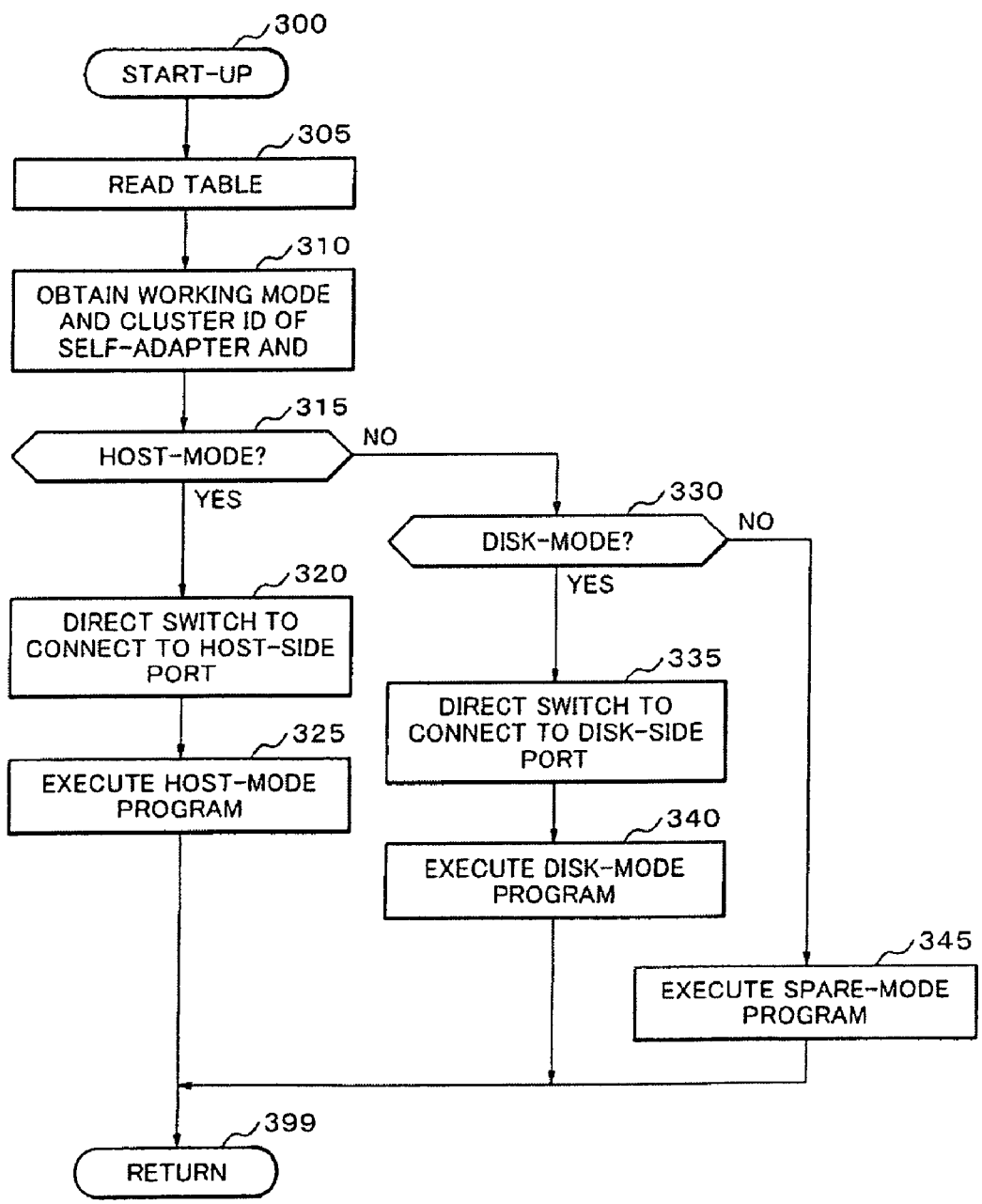
FIG. 3 is a flowchart indicating operation by a start-up program which CPU (Central Processing Unit) of the adapter shown in FIG. 1 executes.

When adapter 23A is activated (power begins to be supplied to adapter 23A), CPU 23A1 of adapter 23A executes a start-up program which performs operation shown by the flowchart of FIG. 3 as Booting program P1. Further, other adapters 23B-23F also execute this start-up program like adapter 23A. Carrying out processing shown in the flowchart of FIG. 3 corresponds to achieving a part of the function of a working mode setting means (setting a working mode and working mode setting unit).

When stated specifically, CPU 23A1 reads adapter attribute information table 241 as shown in FIG. 4 from shared memory 24 at Step 305. Adapter attribute information table 241 is information which specifies, for each adapter, a cluster (including an adapter itself) to which the adapter belongs and an operating mode of the adapter, and which includes a plurality of adapter attribute information which is information including adapter ID, a working mode and cluster ID; Adapter attribute information table 241 is stored in shared memory 24 in advance.

Now, assuming a case where adapter attribute information table 241 includes been set as shown in FIG. 4, description will be continued. That is, in this adapter attribute information table 241, it is prescribed that adapters 23A-23C (that is, adapter of adapter ID #1-#3) belongs to first cluster CL1 (that is, cluster of cluster ID #1). Also, in adapter attribute information table 241, it is prescribed that adapter 23D-23F (that is, adapter of adapter ID #4-#6) belongs to second cluster CL2 (that is, cluster of cluster ID #2).

Further, in adapter attribute information table 241 shown in FIG. 4, it is prescribed that the working mode of adapter 23A and adapter 23D is the host mode. In adapter attribute information table 241 shown in FIG. 4, it is prescribed that the working mode of adapter 23B and adapter 23E is the disk mode. Also, in adapter attribute information table 241 shown in FIG. 4, it is specified that the working mode of adapter 23C and adapter 23F is the spare mode.

At Step 310, CPU 23A1 acquires the working mode of self-adapter 23A and the cluster ID of a cluster to which self-adapter 23A belongs (self-cluster) based on adapter attribute information table 241 read at Step 305 and the adapter ID of adapter 23A (self-adapter). Here, the adapter. ID for the self-adapter is notified from input/output control unit 20 separately.

When following the above-mentioned assumption, CPU 23A1 acquires the host mode as a working mode of self-adapter 23A and acquires #1 as cluster ID for the cluster (self-cluster) to which self-adapter 23A belongs.

Next, CPU 23A1 determines whether an acquired working mode is the host mode at Step 315. And CPU 23A1 judges as Yes and advances towards Step 320.

CPU 23A1 sends a connection instruction signal for connecting terminal 21a1 with which the host side port in the self-cluster (the cluster with cluster ID #1, that is, first cluster CL1) (first host-side port 20a1) is connected and terminal 21a3 with which self-adapter 23A is connected to the switch in the self-cluster (first switch 21). As a result, the connection state of first switch 21 is set to a connection state where host device 2 and adapter 23A are connected.

Next, at Step 325, CPU 23A1 carries out host-mode program P2 as a process which is independent with a process related to execution of this start-up program. Then, CPU 23A1 advances towards Step 399, and finishes execution of this start-up program once. That is, in this state, adapter 23A operates as a first input/output unit that sends and receives data Lo and from host device 2 by being connected with host device 2 via first switch 21.

On the other hand, when beginning execution of this start-up program and then advancing to Step 310, CPU 23B1 of adapter 23B acquires the disk mode as a working mode of self-adapter 23B.

Accordingly, CPU 23B1 determines as No at Step 315, and moves to Step 330. Then, at Step 330, CPU 23B1 determines whether the working mode acquired is the disk mode or not. CPU 23B1 judges a Yes and advances towards Step 335.

Next, CPU 23B1 sends a connection instruction signal for connecting terminal 21a2 with which the disk side port in the self-cluster (first cluster CL1) (first disk-side port 20b1) is connected and terminal 21a4 with which self-adapter 23B is connected to the switch in the self-cluster (first switch 21). As a result, the connection state of first switch 21 is set to a connection state where disk array unit 10 and adapter 23B are connected. That is, the connection state of first switch 21 is set to a connection state where host device 2 and adapter 23A, and disk array unit 10 and adapter 23B are connected, respectively.

After that, at Step 340, CPU 23B1 carries out disk-mode program P3 as a process which is independent with a process related to execution of this start-up program. CPU 23B1 advances towards Step 399, and finishes executing this start-up program once. That is, in this state, adapter 23B operates as a second input/output unit that sends and receives data to and from disk array unit 10 by being connected with disk array unit 10 via first switch 21.

When beginning execution of this start-up program and advancing to Step 310, CPU 23C1 of adapter 23C acquires the spare mode as a working mode of self-adapter 23C.

Accordingly, CPU 23C1 determines as No at Step 315 and Step 330, advances towards Step 345 and carries out spare-mode program P4 as a process which is independent with a process related to execution of this start-up program. CPU 23C1 advances towards Step 399, and finishes executing this start-up program once. That is, in this state, adapter 23C operates as a third input/output unit.

Figure 5:
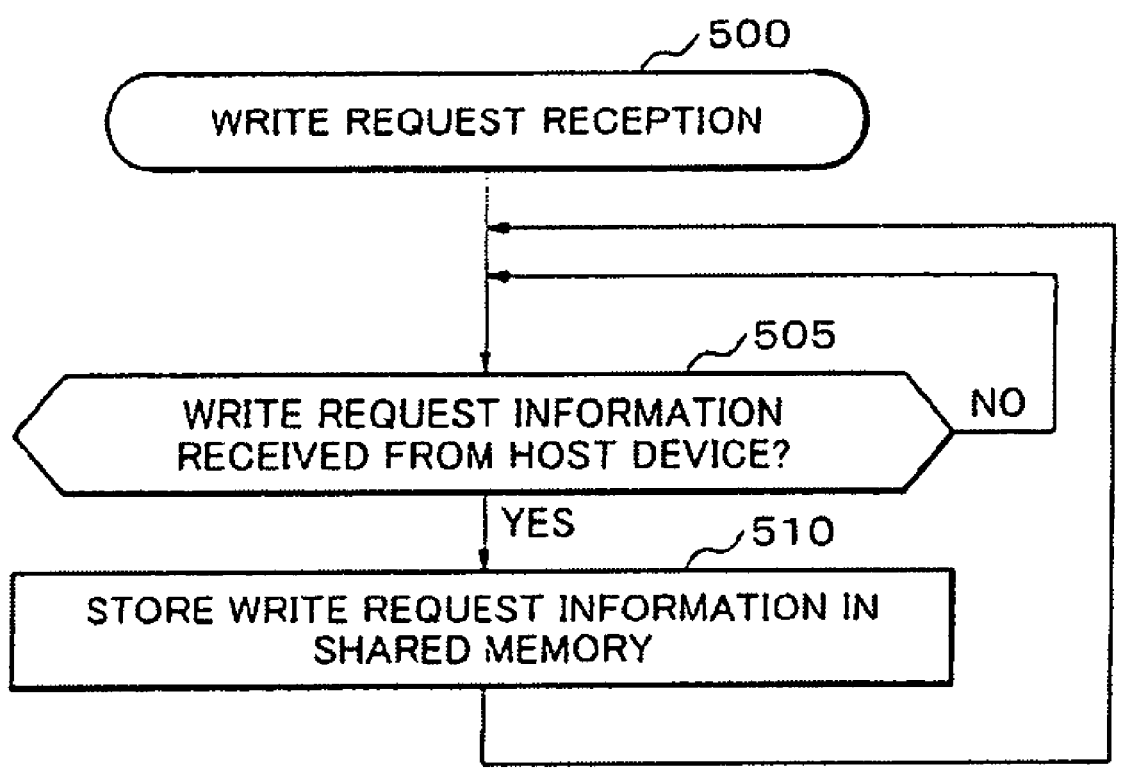
FIG. 5 is a flowchart which indicates operation by a write request reception program which CPU of the adapter shown in FIG. 1 executes.

As mentioned above, by CPU 23A1 of adapter 23A carrying out host-mode program P2 at Step 325, CPU 23A1 executes a write request reception program which a part of host-mode program P2 includes. Operation by this write request reception program is shown in the flowchart of FIG. 5.

When stated specifically, CPU 23A1 stands by at Step 505 until write request information is received from host device 2.

When host device 2 sends write request information to disk array apparatus 1 via first port 2a, CPU 23A1 determines as Yes, and advances towards Step 510 and stores the received write request information in shared memory 24. Then, CPU 23A1 returns to Step 505 and stands by until write request information is received from host device 2 again.

Figure 6:
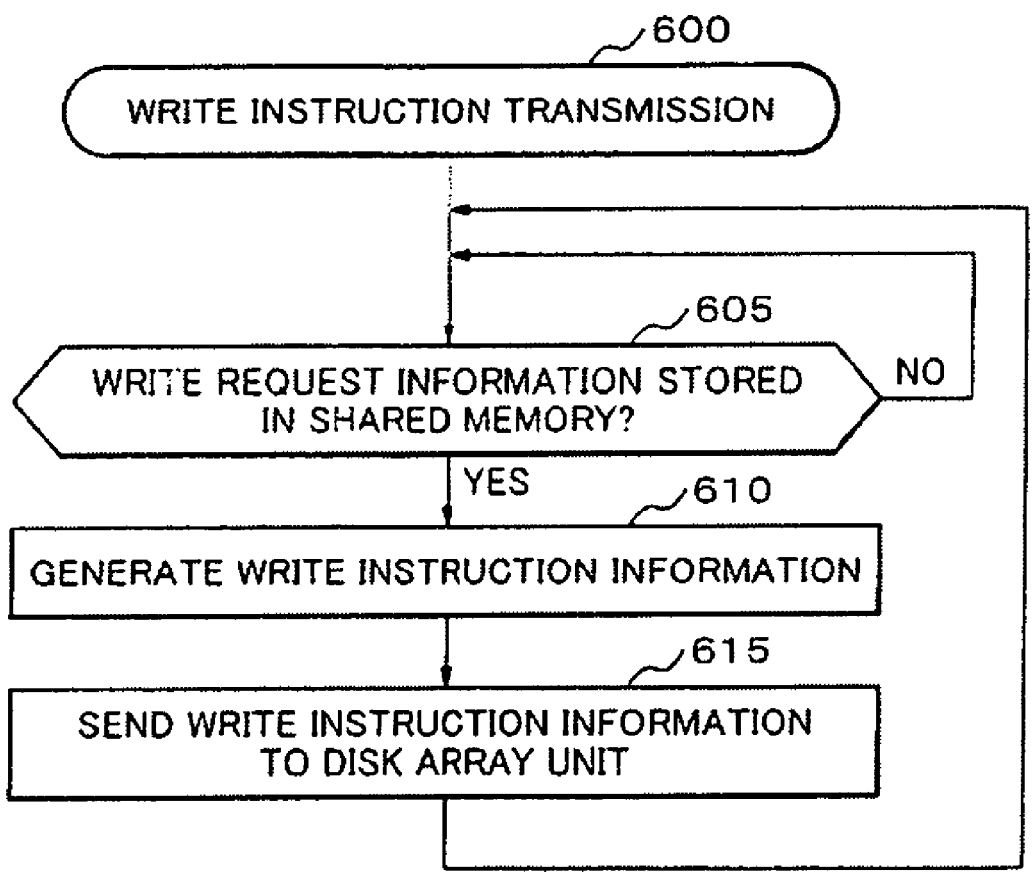
FIG. 6 is a flowchart which indicates operation by a write instruction transmission program which CPU of then adapter shown in FIG. 1 executes.

On the other hand, by CPU 23B1 of adapter 23B carrying out disk-mode program P3 at Step 340, CPU 23B1 executes a write instruction transmission program which a part of disk-mode program P3 includes. Operation by this write instruction transmission program is shown in the flowchart of FIG. 6.

When stated specifically, CPU 23B1 stands by at Step 605 until write request information is stored in shared memory 24. In this state, write request information is stored in shared memory 24 by adapter 23A.

Accordingly, CPU 23B1 determines as Yes, advances towards Step 610, acquires write request information stored in shared memory 24 and erases the write request information from shared memory 24. Moreover, CPU 23B1 generates write instruction information based on acquired write request information.

CPU 23B1 sends the generated write instruction information to disk array unit 10 at Step 615. As a result, disk array unit 10 stores individual disk write data in each of HDDs 10c1-10c16 based on received write instruction information. Then, CPU 23B1 returns to Step 605 and stands by until write request information is stored in shared memory 24 again.

In this way, host device 2 sends write data to disk array unit 10, and disk array unit 10 stores the write data received from host device 2.

Figure 7:
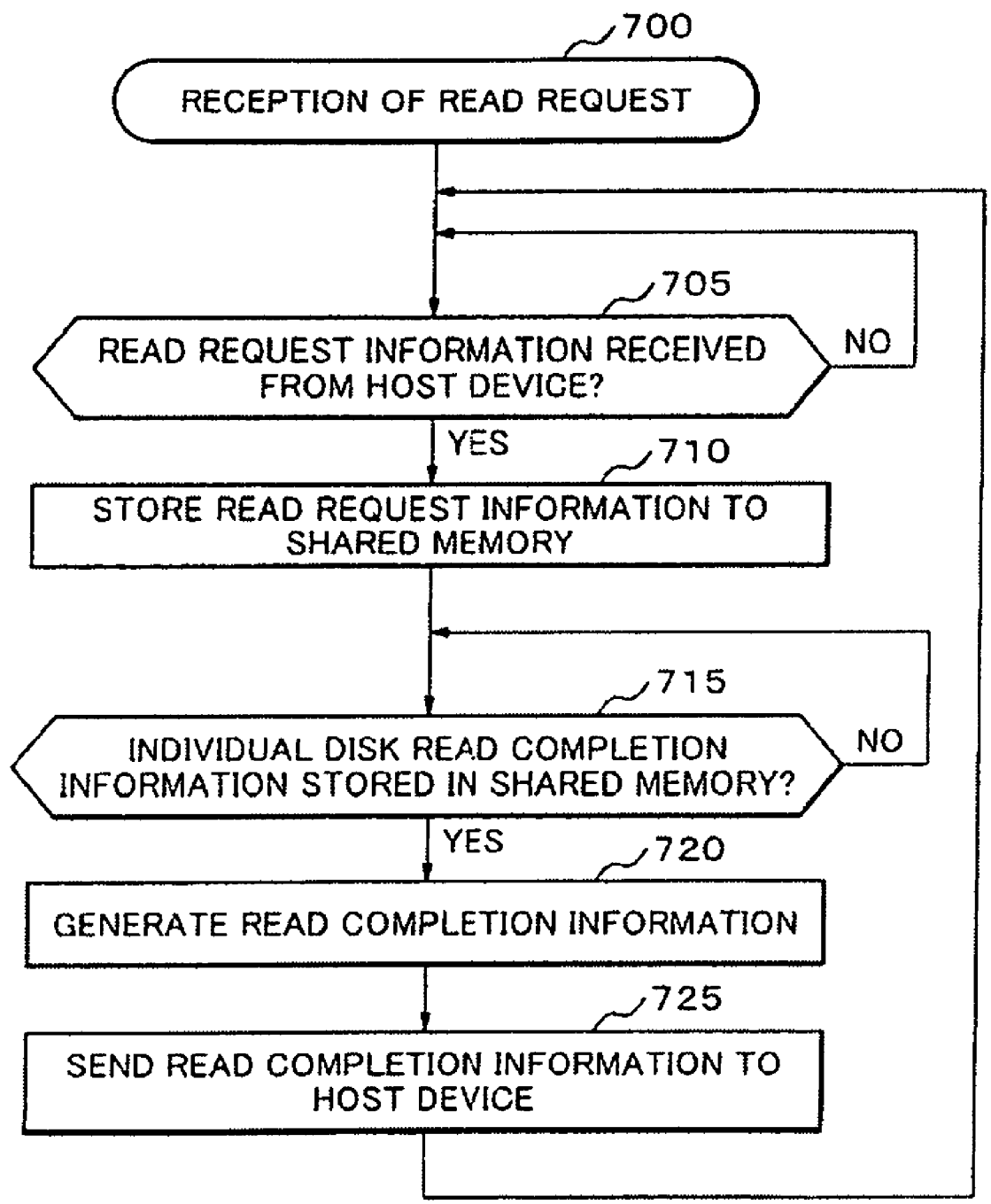
FIG. 7 is a flowchart which indicates operation by a read request reception program which CPU of the adapter shown in FIG. 1 executes.

Further, CPU 23A1 of adapter 23A executes a read request reception program which a part of host-mode program P2 includes. Operation by this read request reception program is shown by the flowchart of FIG. 7.

When stated specifically, CPU 23A1 stands by at Step 705 until read request information is received from host device 2.

When host device 2 sends read request information to disk array apparatus 1 via first port 2a, CPU 23A1 determines as Yes, and advances towards Step 710 and stores the received read request information in shared memory 24.

Next, CPU 23A1 stands by at Step 715 until the individual disk read completion information is stored in shared memory 24.

Figure 8:
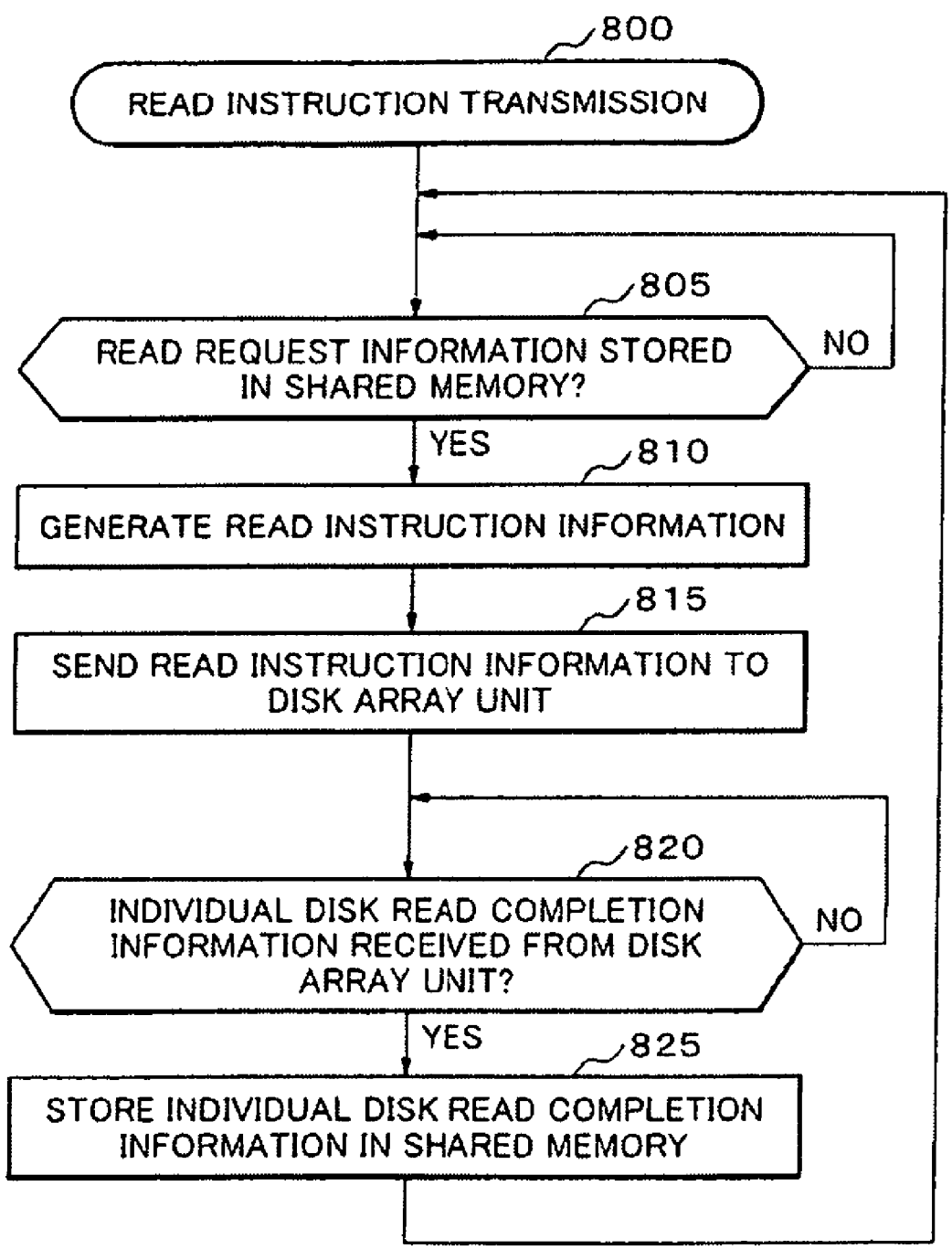
FIG. 8 is a flowchart which indicates operation by a reading instruction transmission program which CPU of the adapter shown in FIG. 1 executes.

Meanwhile, by CPU 23B1 of adapter 23B carrying out disk-mode program P3 at Step 340, CPU 2331 executes a reading instruction transmission program which a part of disk-mode program P3 includes. Operation by this reading instruction transmission program is shown by the flowchart of FIG. 8.

When stated specifically, CPU 23B1 stands by at Step 805 until read request information is stored in shared memory 24. In this state, read request information is stored by adapter 23A in shared memory 24.

Accordingly, CPU 23B1 determines as Yes, advances towards Step 810, acquires read request information stored in shared memory 24 and erases the read request information from shared memory 24. Moreover, CPU 23B1 generates read instruction information based on the acquired read request information.

CPU 23B1 sends the generated read instruction information to disk array unit 10 at Step 815. Next, CPU 23B1 stands by at Step 820 until it receives the individual disk read completion information from disk array unit 10 (until reception of the individual disk read completion information is completed).

Meanwhile, upon receipt of read instruction information, disk array unit 10 reads each individual disk read data from each of HDDs 10c1-10c16 based on the read instruction information. Then, disk array unit 10 sends the individual disk read completion information including the individual disk read data read from each of HDDs 10c1-10c16 to adapter 23B.

When reception of the individual disk read completion information from disk array unit 10 is completed, CPU 23B1 of adapter 23B determines as Yes at Step 820, advances towards Step 825 and stores the received the individual disk read completion information in shared memory 24. Then, CPU 23B1 returns to Step 805 and stands by until read request information is stored in shared memory 24 again.

Meanwhile, when the individual disk read completion information is stored in shared memory 24, CPU 23A1 of adapter 23A judges as Yes at Step 715 and advances towards Step 720. CPU 23A1 acquires the individual disk read completion information stored in shared memory 24 and erases the individual disk read completion information from shared memory 24.

CPU 23A1 generates read completion information based on the acquired individual disk read completion information. Here, read completion information is information including read data in which the individual disk read data included in the individual disk read completion information are connected.

Next, CPU 23A1 sends the generated read completion information to host device 2 at Step 725. Then, CPU 23A1 returns to Step 705 and stands by until read request information is received from host device 2 again.

In this way, according to the request from host device 2, disk array unit 10 sends stored write data to host device 2 as read data, and host device 2 receives the read data from disk array unit 10.

Figure 9:
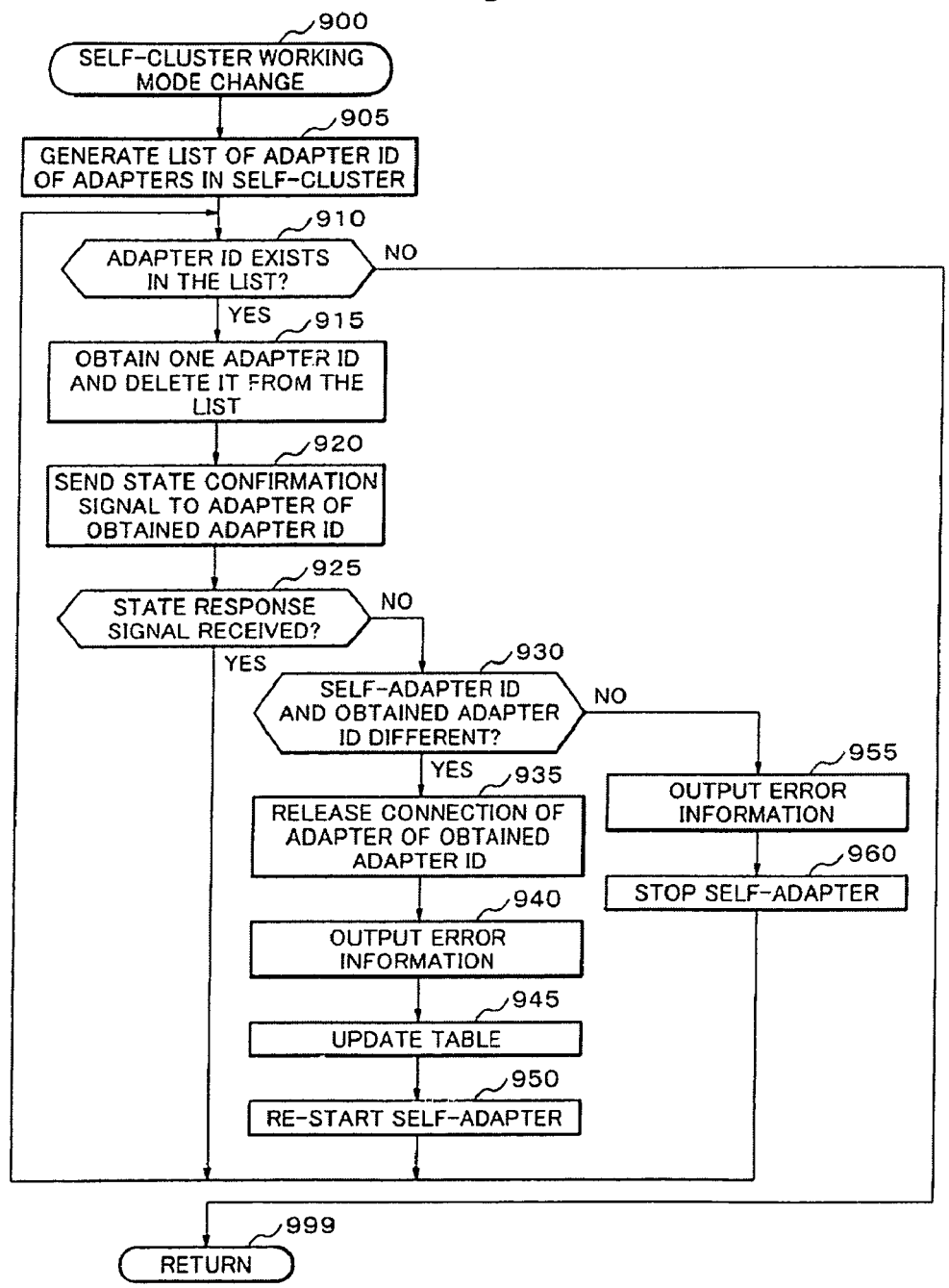
FIG. 9 is a flowchart which indicates operation by a self-cluster working mode change program which CPU of the adapter shown in FIG. 1 executes.

Meanwhile, by CPU 23C1 of adapter 23C carrying out spare-mode program P4 at Step 345, CPU 23C1 carries out a self-cluster working mode change program which spare-mode program P4 includes, whenever a predetermined adapter monitor cycle (5 seconds, for example) passes. Operation by this self-cluster working mode change program is shown by the flowchart of FIG. 9.

When stated specifically, at Step 905, CPU 23C1 creates a list of adapter ID of adapters in the self-cluster based on adapter attribute information table 241 read at Step 305 and the cluster ID for the self-cluster (here, #1) acquired at Step 310. That is, a created list includes #1, #2 and #3.

Next, CPU 23C1 determines whether any adapter ID exists in the list at Step 910. As of this moment, CPU 23C1 determines as Yes, advances towards Step 915, acquires one adapter ID from the list and eliminates (erasing) the acquired adapter ID from the list. Here, CPU 23C1 acquires adapter ID #1.

At Step 920, CPU 23C1 transmits a state confirmation signal to the adapter of the acquired adapter ID (here, adapter 23A).

Next, at Step 925, CPU 23C1 determines whether a state response signal according to the state confirmation signal is received from adapter 23A-adapter 23C which is the destination (here, adapter 23A) (that is, here, whether adapter 23A is operating normally) during a period after transmission of the state confirmation signal and before passage of a predetermined waiting time.

Further, in case the acquired adapter ID is identical with adapter ID of the self-adapter (in this example, when the acquired adapter ID is #3), CPU 23C1 may judge whether self-adapter 23C is normally in operation by performing processing for self-diagnosis without transmitting a state confirmation signal.

Carrying out processing indicated in Step 920 and Step 925 corresponds to achieving the function of an abnormal state detecting means (detecting an abnormal state and an abnormal state detecting unit).

Now, a case when all of adapter 23A, adapter 23B and adapter 23C are normally in operation (i.e., they are not in an abnormal state) is assumed and description is continued.

In this case, when a state confirmation signal is received, adapter 23A transmits a state response signal to adapter 23C which is the sender of the state confirmation signal immediately. Accordingly, CPU 23C1 receives the above-mentioned state response signal from adapter 23A during a period after a state confirmation signal is transmitted and until the above-mentioned waiting time passes. Accordingly, CPU 23C1 judges as Yes at Step 925 and returns to Step 910, and repeats Steps 910-925 until there is no adapter ID existing in the list any more.

That is, CPU 23C1 confirms that each of adapter 23B with adapter ID #2 and adapter 23C with adapter ID #3 are normally in operation (that is, a state response signal is transmitted according to the state confirmation signal).

After that, when CPU 23C1 advances towards Step 910, CPU 23C1 judges as No at Step 910 and advances towards Step 999 directly, and finishes executing this self-cluster working mode change program once.

That is, in this state, adapter 23C operates in a third working mode where it detects that adapter 23A or adapter 23B is in an abnormal state.

Next, description will be continued about a case in which adapter 23A is in a state that it cannot transmit a state response signal (it is in an abnormal state) when it receives a state confirmation signal in the situation that both of adapter 23B and adapter 23C are normally in operation.

In this case, when CPU 23C1 of adapter 23C advances towards Step 925, CPU 23C1 does not receive the above-mentioned state response signal from adapter 23A during a period after a state confirmation signal is transmitted to adapter 23A and until the above-mentioned waiting time passes.

Accordingly, CPU 23C1 determines as No, advances towards Step 930, and determines whether adapter ID acquired at Step 915 (here, #1) differs from adapter ID of the self-adapter (here, #3).

In this state, CPU 23C1 judges as Yes and advances towards Step 935. Then, CPU 23C1 sends a release instruction signal for releasing the connection between terminal 21a1 with which first host-side port 20a1 is connected and terminal 21a3 with which adapter 23A associated with adapter ID acquired at Step 915 (here, #1) is connected (for cutting off terminal 21a1 and terminal 21a3) to first switch 21. As a result, the connection state of first switch 21 is set to a connection state in which the connection between host device 2 and adapter 23A is released.

Then, at Step 940, CPU 23C1 outputs error information representing that adapter 23A is in an abnormal state (for example, it is written in a log file in shared memory 24).

Next, at Step 945, CPU 23C1 generates adapter attribute information table 241 for update as shown in FIG. 10 in which the working mode associated with adapter ID acquired at Step 915 (here, #1) (that is, a working mode included in the adapter attribute information including adapter ID #1 (here, host mode)), and a working mode associated with adapter ID of the self-adapter (here, #3) (here, spare mode) of adapter attribute information table 241 stored in shared memory 24 are exchanged. Further, CPU 23C1 replaces adapter attribute information table 241 stored in shared memory 24 with adapter attribute information table 241 for update generated.

As a result, the processing of a start-up program which performs operation that adapter 23C executes at start-up, and which carries out operation shown by the flowchart of FIG. 3 is changed at the time of a re-start of adapter 23C.

Next, CPU 23C1 makes self-adapter 23C restart at Step 950. Further, carrying out processing indicated in Steps 935-950 corresponds to achieving a part of the function of the working mode setting means (setting a working mode and working mode setting unit).

As a result, CPU 23C1 executes a start-up program of FIG. 3. CPU 23C1 reads adapter attribute information table 241 shown in FIG. 10 at Step 305. Next, CPU 23C1 acquires the host mode as a working mode of self-adapter 23C at Step 310.

Figure 11:
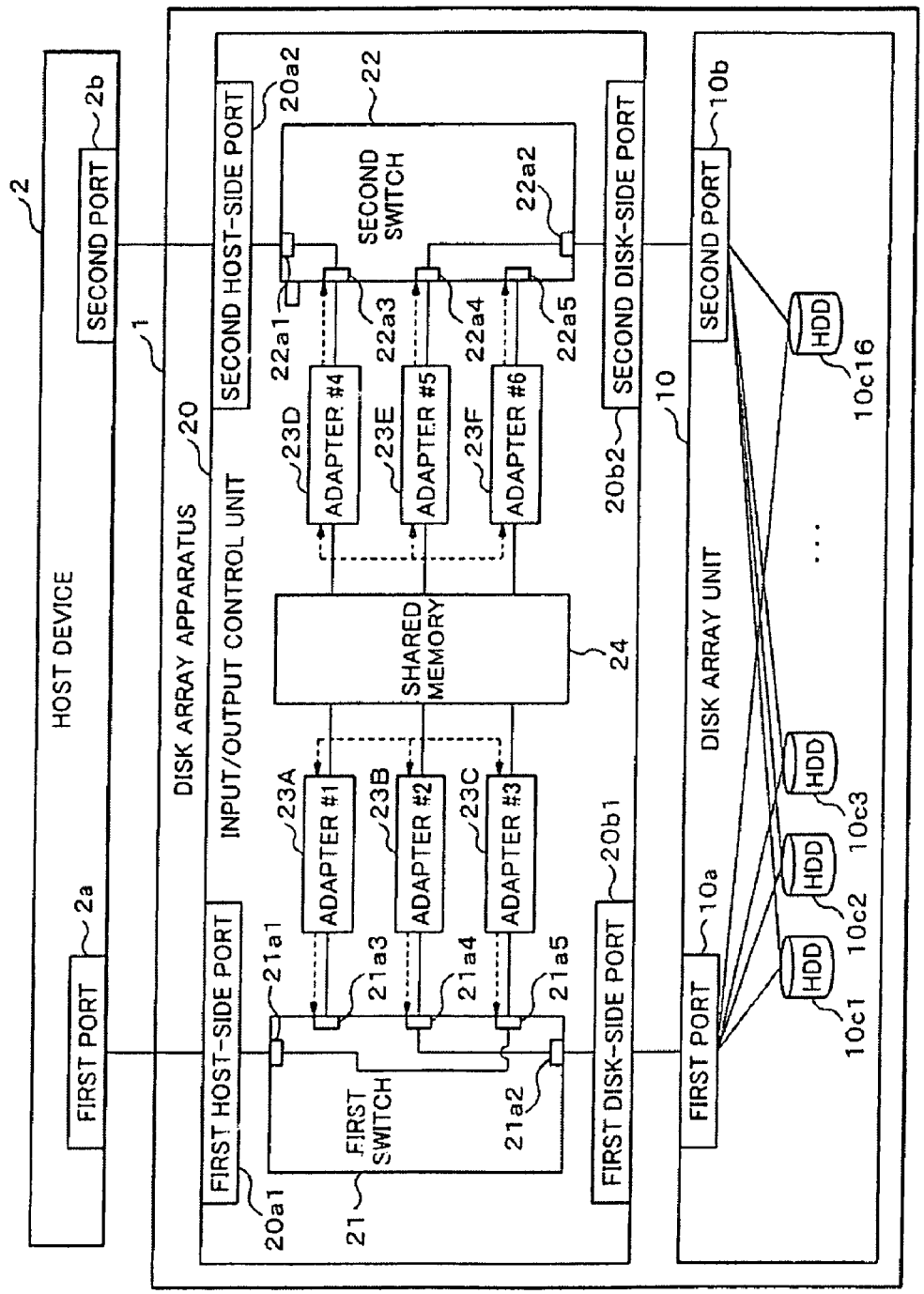
FIG. 11 is a drawing which indicates a disk array apparatus in the state that the adapter of the adapter ID #3 is connected with a host device.

After that, CPU 23C1 repeats processing of Steps 315-325. As a result, the connection state of first switch 21 is set to a state that a connection between first host-side port 20a1 (that is, host device 2) and adapter 23A is released. Also, the connection state of first switch 21 is set to a connection state in which first host-side port 20a1 (that is, host device 2) and adapter 23C are connected (it is also called a first connection state). That is, in this state, as shown in FIG. 11, first host-side port 20a1 and adapter 23C are connected, and first disk-side port 20b1 and adapter 23B are connected.

Moreover, CPU 23C1 carries out host-mode program P2 (refer to FIG. 5 and FIG. 7).

In this way, adapter 23C operates in the host mode instead of adapter 23A which is in an abnormal state. That is, in this state, adapter 23C operates in the first working mode in which it sends and receives data to and from host device 2.

As a result, adapter 23C can transfer data to and from host device 2 which includes been transferring data to and from adapter 23A which is in an abnormal state. As a result, a period from time when adapter 23A falls in an abnormal state to time when input/output control unit 20 becomes capable of transferring data to and from host device 2 normally, can be made short sufficiently (in this exemplary embodiment, tens of seconds at most, for example).

Next, a case in which adapter 23B is in a state that it cannot transmit a state response signal (it is in an abnormal state) when it receives a state confirmation signal in the situation that both of adapter 23A and adapter 23C are normally in operation will be described.

In this case, when CPU 23C1 of adapter 23C advances towards Step 925, CPU 23C1 does not receive the above-mentioned state response signal from adapter 23B during a period after a state confirmation signal is transmitted to adapter 23B and until the above-mentioned waiting time passes.

Accordingly, CPU 23C1 determines as No, advances towards Step 930, and determines whether adapter ID acquired at Step 915 (here, #2) differs from adapter ID (here, #3) of the self-adapter.

In this state, CPU 23C1 judges as Yes and advances towards Step 935. Then, CPU 23C1 sends a release instruction signal for releasing the connection between terminal 21a2 with which first disk-side port 20b1 is connected and terminal 21a4 with which adapter 23B associated with adapter ID acquired at Step 915 (here, #2) is connected (for cutting off terminal 21a2 and terminal 21a4) to first switch 21. As a result, the connection state of first switch 21 is set to a connection state in which the connection between disk array unit 10 and adapter 23B is released.

Then, at Step 940, CPU 23C1 outputs error information representing that adapter 23B is in an abnormal state (for example, it is written in a log file in shared memory 24).

Next, at Step 945, CPU 23C1 generates adapter attribute information table 241 for update as shown in FIG. 12 in which a working mode associated with adapter ID (here, #2) acquired at Step 915 (here, disk mode), and a working mode associated with adapter ID of the self-adapter (here, #3) (here, spare mode) of adapter attribute information table 241 stored in shared memory 24 are exchanged. Further, CPU 23C1 replaces adapter attribute information table 241 stored in shared memory 24 with adapter attribute information table 241 for update generated.

Next, CPU 23C1 makes self-adapter 23C restart at Step 950.

As a result, CPU 23C1 executes a start-up program of FIG. 3. CPU 23C1 reads adapter attribute information table 241 shown in FIG. 12 at Step 305. Next, CPU 23C1 acquires the disk mode as a working mode of self-adapter 23C at Step 310.

Figure 13:
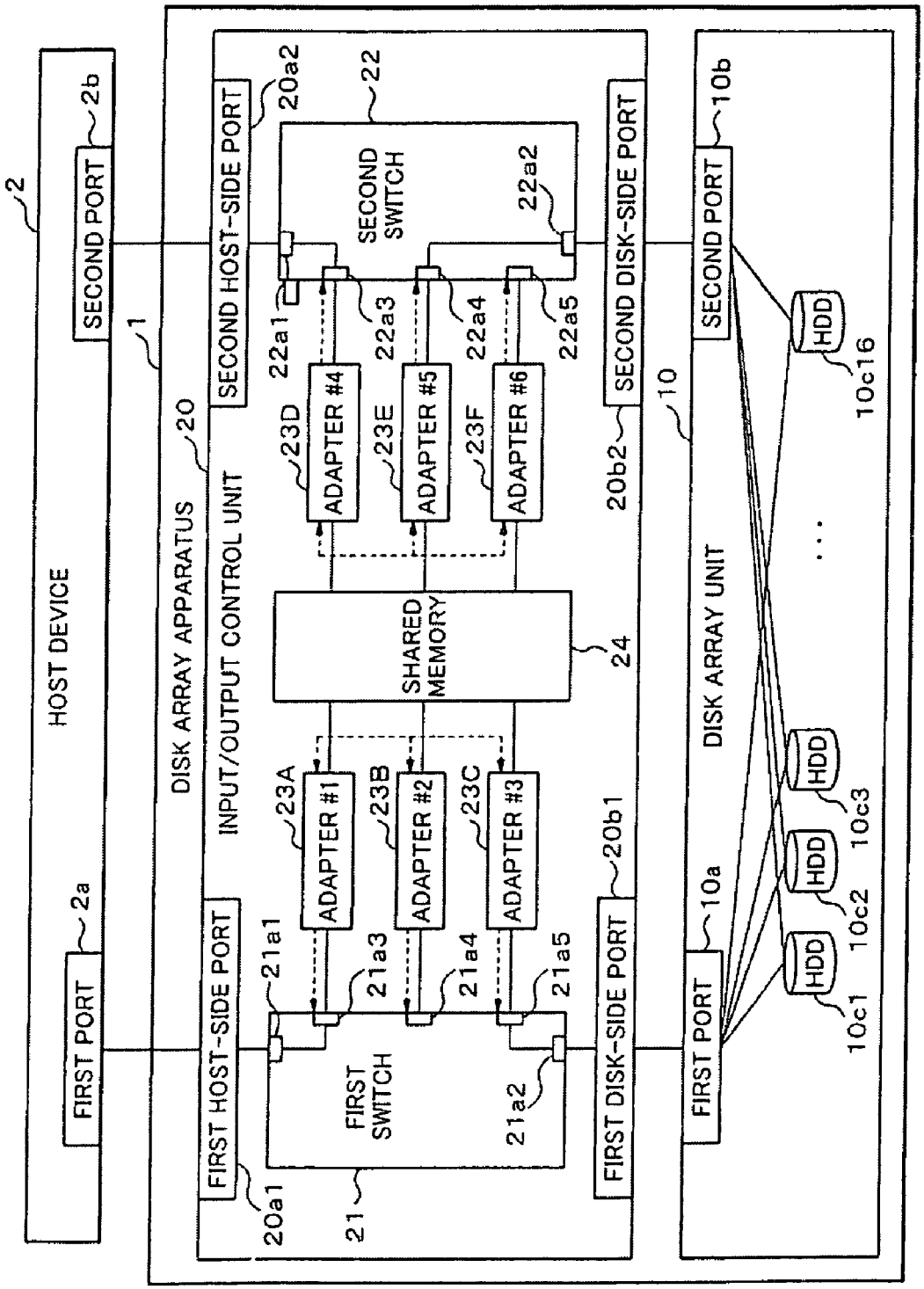
FIG. 13 is a drawing which indicates a disk array apparatus in the state that the adapter of the adapter ID #3 is connected with a disk array unit.

After that, CPU 23C1 repeats processing of Steps 330-340. As a result, the connection state of first switch 21 is set in a state where the connection between first disk-side port 20b1 (that is, disk array unit 10) and adapter 23B is released. Also, the connection state of first switch 21 is set to a connection state in which first disk-side port 20b1 (that is, disk array unit 10) and adapter 23C are connected (it is also called a second connection state). That is, in this state, as shown in FIG. 13, first host-side port 20a1 and adapter 23A are connected and first disk-side port 20b1 and adapter 23C are connected.

Further, CPU 23C1 carries out disk-mode program P3 (refer to FIG. 6 and FIG. 8).

In this way, adapter 23C operates in the disk mode in place of adapter 23B which is in an abnormal state. That is, in this state, adapter 23C operates in the second working mode in which it sends and receives data to and from disk array unit 10.

As a result, adapter 23C can transfer data to and from disk array unit 10 which includes been transferring data to and from adapter 23B which is in an abnormal state. As a result, a period from time when adapter 23B falls in an abnormal state to time when input/output control unit 20 becomes capable of transferring data to and from disk array unit 10 normally, can be made short sufficiently (in this exemplary embodiment, tens of seconds at most, for example).

Next, a case in which adapter 23C is in a state that it cannot transmit a state response signal (it is in an abnormal state) when it receives a state confirmation signal in the situation that both of adapter 23A and adapter 23B are normally in operation will be described.

In this case, when CPU 23C1 of adapter 23C advances towards Step 925, CPU 23C1 does not receive the above-mentioned state response signal from adapter 23C during a period after a state confirmation signal is transmitted to adapter 23C and until the above-mentioned waiting time passes.

Accordingly, CPU23C1 determines as No, advances towards Step 930, and determines whether adapter ID acquired at Step 915 (here, #3) differs from adapter ID (here, #3) of the self-adapter.

In this state, the acquired adapter ID and the adapter ID of the self-adapter are identical. Accordingly, CPU23C1 determines as No, advances towards Step 955, and outputs error information which represents that adapter 23C is in an abnormal state (for example, it is written in a log file in shared memory 24).

Next, CPU23C1 stops self-adapter 23C at Step 960.

As described above, according to the first exemplary embodiment, a period from time when adapter 23A adapter 23B falls in an abnormal state to time when input/output control unit 20 becomes capable of transferring data to and from both host device 2 and disk array unit 10 normally, can be made short sufficiently (in this exemplary embodiment, tens of seconds at most, for example).

The reason is because, when adapter 23C detects an abnormal state of adapter 23A or adapter 23B, it makes its working mode to be a working mode of adapter 23A or adapter 23B which is in an abnormal state.

Moreover, in the above-mentioned first exemplary embodiment, the number of spare adapters (that is, for securing redundancy) can be reduced compared to a case where two adapters (it is also called an input/output unit) as a spare adapter for transferring data to and from host device 2 and a spare adapter for transferring data to and from disk array unit 10 are prepared.

The reason is that adapter 23C can change its working mode into both working modes of adapter 23A and adapter 23B.

Further, in the above-mentioned first exemplary embodiment, the production cost of an input/output control unit can be reduced, because a unit which detects an abnormal state of adapter 23A or adapter 23B does not need to be installed separately.

The reason is that adapter 23C which operates in the spare mode is configured to defect that adapter 23A which operates in the host mode or adapter 23B which operates in the disk mode is in an abnormal state.

Moreover, in the above-mentioned first exemplary embodiment, data between adapter 23C connected newly and an external apparatus (in this exemplary embodiment, host device 2 or disk array unit 10) can be transferred more reliably.

The reason is that the connection between adapter 23A and host device 2 is released when adapter 23A is in an abnormal state, and the connection between adapter 23B and disk array unit 10 is released when adapter 23B is in an abnormal state.

Next, an input/output control unit according to the second exemplary embodiment will be described in detail with reference to FIGS. 1-16. An input/output control unit according to the second exemplary embodiment detects that the first switch or the second switch is in an abnormal state. Also, an input/output control unit according to the second exemplary embodiment connects, when it is detected that one of the first switch and the second switch is in an abnormal state, between an adapter and an external apparatus which have been connected via the switch via the other switch. An input/output control unit according to the second exemplary embodiment differs only in a point that it is configured as mentioned above to an input/output control unit according to the first exemplary embodiment. Accordingly, hereinafter, description will be made centering on the point of difference.

Figure 14:
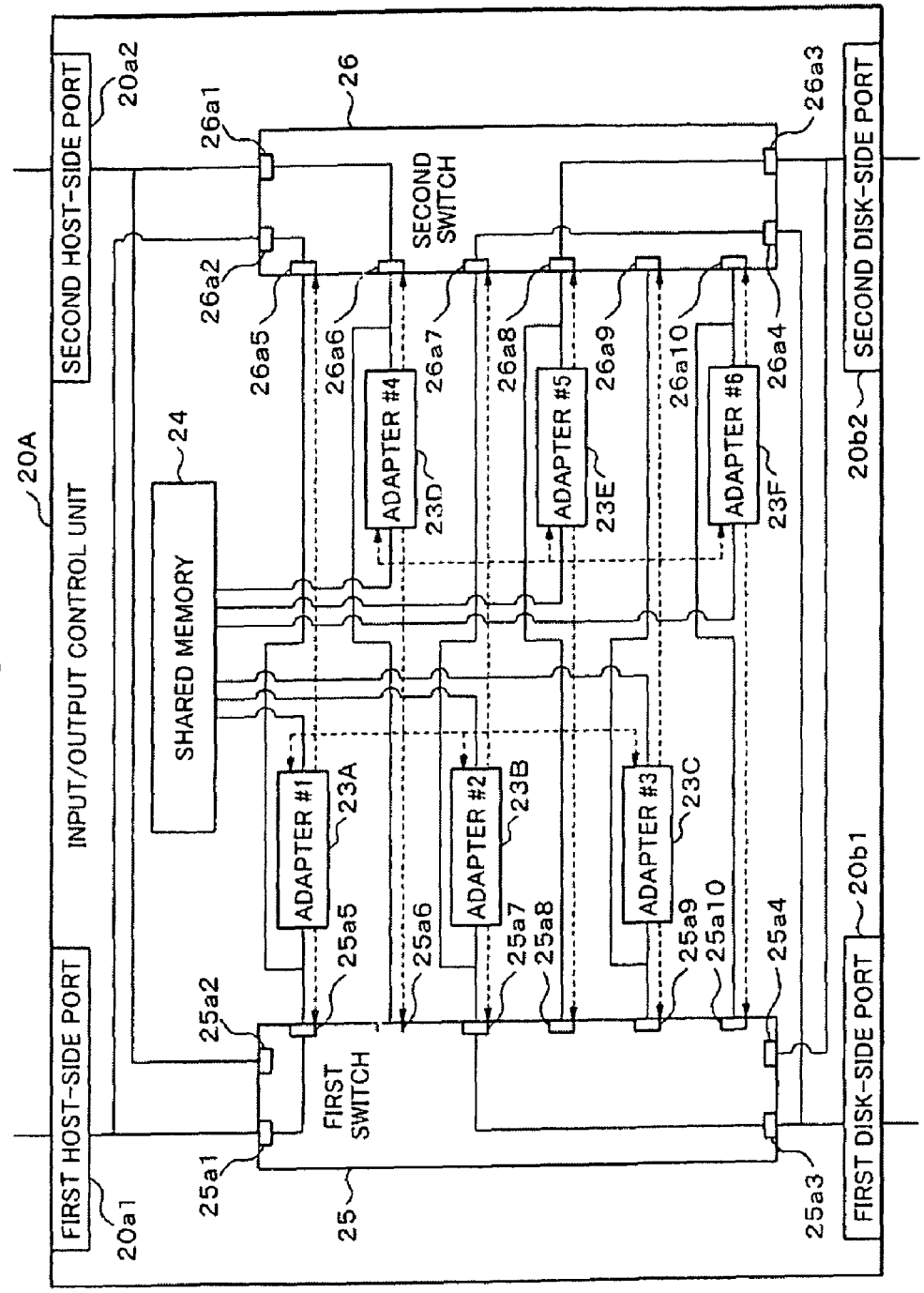
FIG. 14 is a drawing illustrating the schematic configuration of the input/output control unit according to a second exemplary embodiment.

As shown in FIG. 14, input/output control unit 20A according Lo the second exemplary embodiment includes first switch 25 and second switch 26 instead of first switch- 21 and second switch 22 according to the first exemplary embodiment.

First switch 25 includes a plurality of terminals 25a1-25a10 (in this exemplary embodiment, 10, for example). First switch 25 replies to a connection instruction signal from adapters 23A-23F and connects two optional terminals among terminals 25a1-25a10 electrically. On the other hand, first switch 25 replies to a release instruction signal from adapters 23A-23F and releases (cuts off) a connection between two terminals being connected. Moreover, when a state confirmation signal is received from adapters 23A-23F, first switch 25 transmits a state response signal to the adapter which is the sender of the state confirmation signal immediately.

Further, second switch 26 includes a plurality of terminals 26a1-26a10 (in this exemplary embodiment, 10, for example) like first switch 25. Second switch 26 replies to a connection instruction signal to connect two terminals, and replies to a release instruction signal to release a connection between two terminals being connected like first switch 25. Moreover, second switch 26 replies to a state confirmation signal and transmits a state response signal like first switch 25.

Switch ID #1 as information for identifying a switch is attached to first switch 25, and switch ID #2 is attached to second switch 26.

First host-side port 20a1 is connected with each of terminal 25a1 of first switch 25 and terminal 26a2 of second switch 26. Second host-side port 20a2 is connected with each of terminal 25a2 of first switch 25 and a terminal 26a1 of second switch 26.

First disk-side port 20b1 is connected with each of terminal 25a3 of first switch 25 and a terminal 26a4 of second switch 26. Second disk-side port 20b2 is connected with each of terminal 25a4 of first switch 25 and a terminal 26a3 of second switch 26.

Adapter 23A is connected with each of terminal 25a5 of first switch 25, terminal 26a5 of second switch 26 and shared memory 24. As a result, adapter 23A sends and receives data (including an instruction signal, confirmation signal, response signal, request information, instruction information and other control information or the like) to and from each of terminal 25a5 of first switch 25, terminal 26a5 of second switch 26 and shared memory 24.

Similarly, adapter 23B is connected with each of terminal 25a7 of first switch 25, terminal 26a7 of second switch 26 and shared memory 24 in order to transfer data. Adapter 23C is connected with each of terminal 25a9 of first switch 25, terminal 26a9 of second switch 26 and shared memory 24 in order to transfer data.

Moreover, adapter 23D is connected with each of terminal 25a6 of first switch 25, terminal 26a6 of second switch 26 and shared memory 24 in order to transfer data. Further, adapter 23E is connected with each of terminal 25a8 of first switch 25, terminal 26a8 of second switch 26 and shared memory 24 in order to transfer data. Moreover, adapter 23F is connected with each of terminal 25a10 of first switch 25, terminal 26a10 of second switch 26 and shared memory 24 in order to transfer data.

Next, operation of input/output control unit 20A configured as mentioned above will be described.

In shared memory 24 of input/output control unit 20A, an in-use switch information table which includes a plurality of (in this exemplary embodiment, two, for example) pieces of in-use switch information which is information for specifying a switch used in each cluster and which is information including cluster ID and switch ID is stored in advance.

In the above-mentioned first exemplary embodiment, each of adapters 23A-23F of input/output control unit 20 adopts a switch in the self-cluster as a destination of the above-mentioned connection instruction signal in Step 320 and Step 335 of FIG. 3. However, in this second exemplary embodiment, each of adapters 23A-23F of input/output control unit 20A adopts a switch which is specified based on an in-use switch information table and self-cluster ID stored in shared memory 24 as a destination of the connection instruction signal.

Meanwhile, adapters for which a working mode is set to the host mode or the disk mode among adapters 23A-23F of input/output control unit 20A carries out operation shown in flowcharts of FIGS. 5-8. Further, these adapters carries out operation according to a switch change program shown in the flowchart of FIG. 15 repeatedly, whenever the predetermined switch monitor cycle (one second, for example) passes.

Now, assuming a case where each adapters 23A-23F has just been started in the state that adapter attribute information table 241 shown in FIG. 4 is stored in shared memory 24 and both of first switch 25 and second switch 26 are normally in operation (they are not in an abnormal state), description will be continued. Further, in this state, the in-use switch information table stored in shared memory 24 includes in-use switch information including cluster ID #1 and switch ID #1 and in-use switch information including cluster ID #2 and switch ID #2.

In this case, at Step 1505, CPU 23A1 of adapter 23A sends (transmits) a state confirmation signal to the switch in the self-cluster (here, first switch 25) based on cluster ID of the self-cluster acquired at Step 310 (here, #1).

Next, at Step 1510, CPU 23A1 determines whether a state response signal according to the state confirmation signal is received from first switch 25 (that is, whether first switch 25 is operating normally) during a period after transmission of the state confirmation signal and until- passage of a predetermined waiting time. Carrying out processing indicated in Step 1505 and Step 1510 corresponds to achieving the function of a switch abnormal state detecting means (detecting a switch abnormal state and an abnormal state detecting unit).

In this state, when a state confirmation signal is received, first switch 25 transmits a state response signal to adapter 23A which is the sender of the state confirmation signal immediately. Accordingly, CPU 23A1 receives the above-mentioned state response signal from first switch 25 during a period after a state confirmation signal is transmitted and until the above-mentioned waiting time passes.

Accordingly, CPU 23A1 judges as Yes at Step 1510, moves to Step 1515, and determines whether self-adapter 23A is connected with an external apparatus (host device 2) via the switch of the self-cluster (first switch 25).

In this state, adapter 23A is connected with host device 2 via first switch 25. Accordingly, CPU 23A1 judges as Yes and advances towards Step 1599 directly, and finishes executing this switch change program once.

Meanwhile, each of adapter 23B, adapter 23D and adapter 23E also begins to execute this switch change program. In this state, each adapter 23B, 23D and 23E performs processing of Steps 1505-1515 in turn like a case of adapter 23A, and finishes executing this switch change program once.

Next, a case in which first switch 25 is in a state that it cannot transmit a state response signal (it is in an abnormal state) when it receives a state confirmation signal in the situation that second switch 26 is normally in operation will be described.

In this case, when CPU 23A1 of adapter 23A advances towards Step 1510, CPU 23A1 does not receive the above-mentioned state response signal from first switch 25 during a period after a state confirmation signal is transmitted to first switch 25 and until the above-mentioned waiting time passes.

Accordingly, CPU 23A1 determines as No, advances towards Step 1520, and sends a state confirmation signal to the switch in a cluster besides the self-cluster (the other cluster) (that is, second switch 26) based on cluster ID of the self-cluster (here, #1).

Next, at Step 1525, CPU 23A1 determines whether a state response signal according to the state confirmation signal is received from second switch 26 (that is, whether second switch 26 is operating normally) during a period after transmission of the state confirmation signal and before passage of a predetermined waiting time.

In this state, when a state confirmation signal is received, second switch 26 transmits a state response signal to adapter 23A which is the sender of the state confirmation signal immediately. Accordingly, CPU 23A1 receives the above-mentioned state response signal from second switch 26 during a period after a state confirmation signal is transmitted and until the above-mentioned waiting time passes.

Accordingly, CPU 23A1 judges as Yes at Step 1525 and advances towards Step 1530, and determines whether self-adapter 23A is connected with host device 2 via the switch of the self-cluster (first switch 25).

In this state, adapter 23A is connected with host device 2 via first switch 25. Accordingly, CPU 23A1 judges as Yes and advances towards Step 1535.

CPU 23A1 sends a release instruction signal for releasing the connection between terminal 25a1 with which first host-side port 20a1 is connected and terminal 25a5 with which self-adapter 23A is connected to first switch 25. As a result, the connection state of first switch 25 is set to a connection state where the connection between host device 2 and adapter 23A is released.

Moreover, CPU 23A1 sends a connection instruction signal for connecting terminal 26a2 with which first host-side port 20a1 is connected and terminal 26a5 with which self-adapter 23A is connected to second switch 26. As a result, the connection state of second switch 26 is set to a connection state where host device 2 and adapter 23A is connected.

In this way, when it is detected that an in-use switch (first switch 25) is in an abnormal state, adapter 23A and host device 2 which have been connected via the in-use switch are connected via a switch besides the in-use switch (second switch 26).

Further, CPU 23A1 changes switch ID (here, #1) included in in-use switch information which is in the in-use switch information table stored in shared memory 24 and which includes cluster ID #1 of the self-cluster (first cluster CL1) as cluster ID to switch ID of the switch in the other cluster (second cluster CL2) (that is, switch ID #2).

CPU 23A1 advances towards Step 1599, and finishes executing this switch change program once. Carrying out processing indicated in Steps 1520-1535 corresponds to achieving the function of a switch change means (changing a switch and switch change unit).

Moreover, adapter 23B also performs processing of Steps 1520-1535 in turn like a case of adapter 23A. As a result, the connection state of first switch 25 is set to a connection state where the connection between disk array unit 10 and adapter 23B is released. Moreover, the connection state of second switch 26 is set to a connection state in which disk array unit 10 and adapter 23B are connected.

Figure 16:
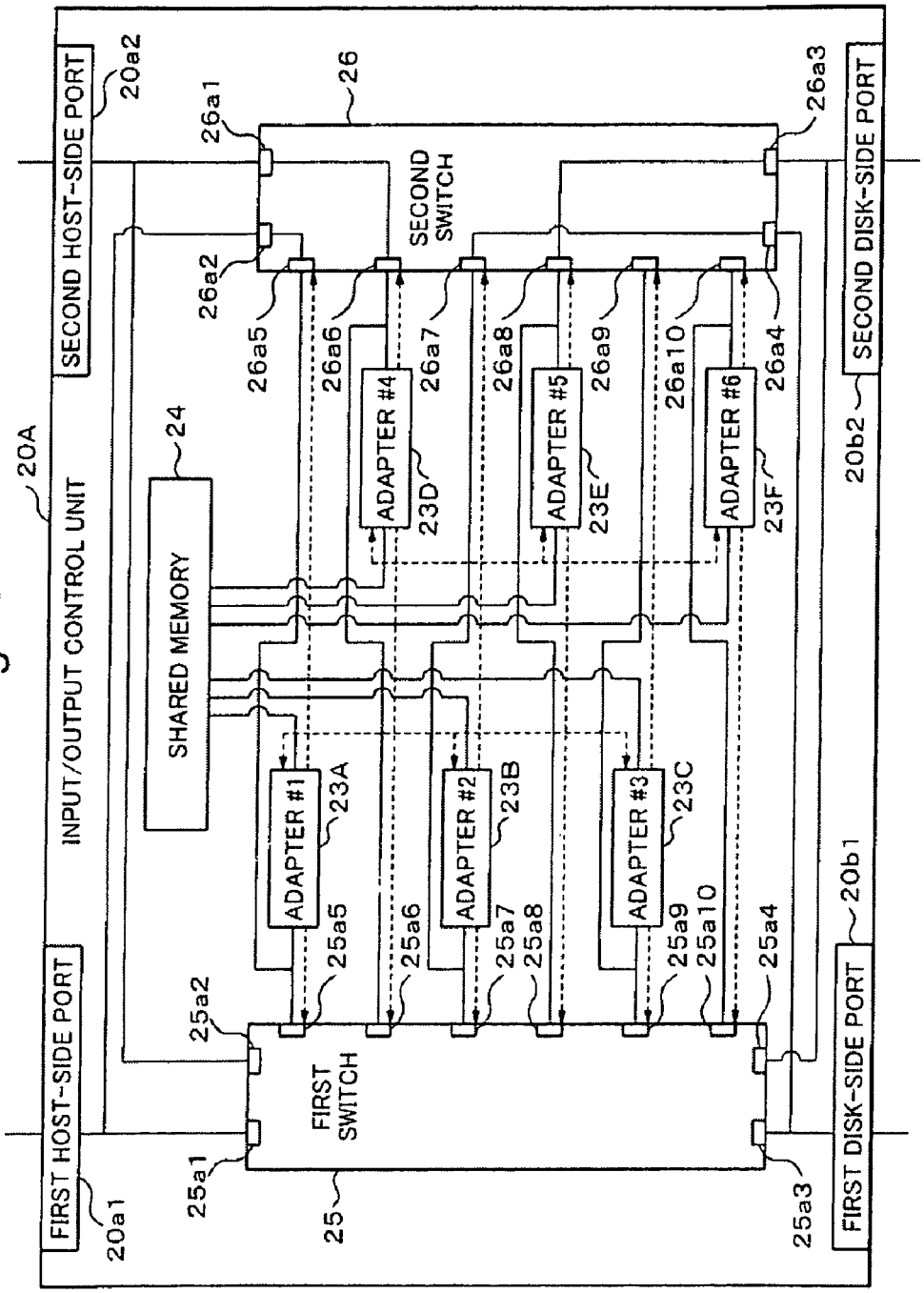
FIG. 16 is a drawing which indicates an input/output control unit in the state that the adapter of the adapter ID #1 and the adapter of adapter ID #2 are connected with a host device and a disk array unit respectively via a second switch.

That is, in this state, as shown in FIG. 16, adapter 23A is connected with host device 2 by going through second switch 26 and first host-side port 20a1 in this order. Moreover, adapter 23B is connected with disk array unit 10 by going through second switch 26 and first disk-side port 20b1 in this order.

Figure 15:
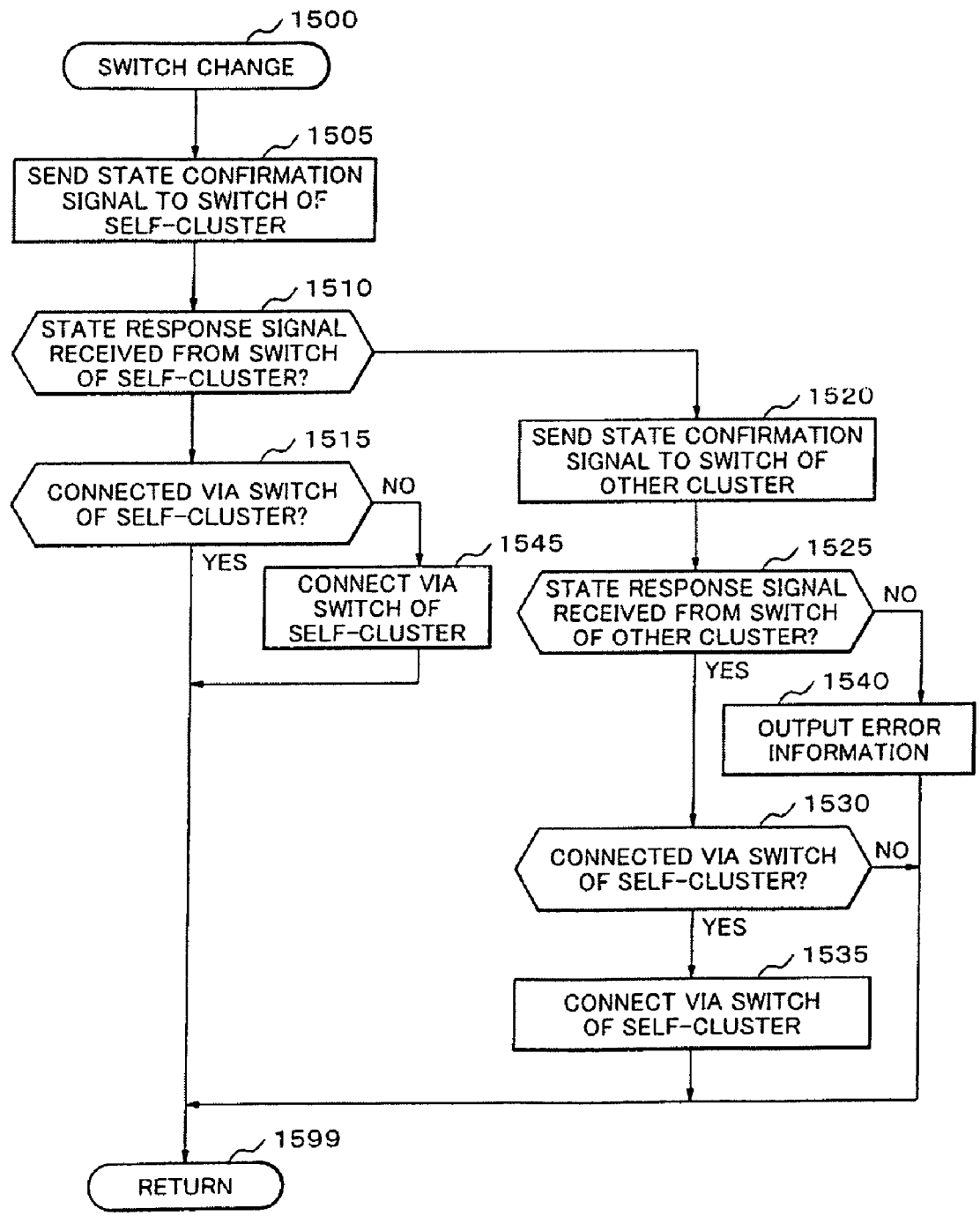
FIG. 15 is a flowchart which indicates operation by a switch change program which CPU of the adapter shown in FIG. 14 executes.

Accordingly, in this state, when CPU 23A1 of adapter 23A begins execution of the switch change program of FIG. 15 and advances towards Step 1530, CPU 23A1 judges as No and advances towards Step 1599 directly, and finishes executing this switch change program once.

Next, description will be continued about a case in which, after that, second switch 26 is also in a state that it cannot transmit a state response signal (it is in an abnormal state) when it receives a state confirmation signal in addition to first switch 25.

In this case, when CPU 23A1 of adapter 23A begins execution of the switch change program of FIG. 15 and advances towards Step 1525, CPU 23A1 does not receive the above-mentioned state response signal from second switch 26 during a period after a state confirmation signal is transmitted to second switch 26 and until the above-mentioned waiting time passes.

Accordingly, CPU 23A1 determines as No, advances towards Step 1540, and outputs error information which represents that, both of first switch 25 and second switch 26 are in an abnormal state (for example, it is written in a log file in shared memory 24). CPU 23A1 advances towards Step 1599, and finishes executing this switch change program once.

Meanwhile, a case where first switch 25 returns to a state to operate normally (i.e., when it receives a state confirmation signal, it transmits a state response signal) after it has been in an abnormal state once will be described.

In this case, when CPU 23A1 of adapter 23A begins execution of the switch change program of FIG. 15 and advances towards Step 1510, CPU 23A1 judges as Yes and advances towards Step 1515.

In this state, adapter 23A is connected with host device 2 via the switch of a cluster besides the self-cluster (second switch 26). Accordingly, CPU 23A1 judges as No at Step 1515 and advances towards Step 1545.

CPU 23A1 sends a release instruction signal for releasing the connection between terminal 26a2 with which first host-side port 20a1 is connected and terminal 26a5 with which self-adapter 23A is connected to second switch 26. As a result, the connection state of second switch 26 is set to a connection state where the connection between host device 2 and adapter 23A is released.

Moreover, CPU 23A1 sends a connection instruction signal for connecting terminal 25a1 with which first host-side port 20a1 is connected and terminal 25a5 with which self-adapter 23A is connected to first switch 25. As a result, the connection state of first switch 25 is set to a connection state where host device 2 and adapter 23A are connected.

Further, CPU 23A1 changes switch ID (here, #2) included in in-use switch information which is in the in-use switch information table stored in shared memory 24 and which includes cluster ID #1 of the self-cluster (first cluster CL1) as cluster ID to switch ID of the switch in the self-cluster (that is, switch ID #1).

Then, CPU 23A1 advances towards Step 1599, and finishes executing this switch change program once.

Moreover, adapter 23B also performs processing of Step 1545 like a case of adapter 23A. As a result, the connection state of first switch 25 is set to a connection state where disk array unit 10 and adapter 23B are connected. Moreover, the connection state of second switch 2 6 is set to a connection state where a connection between disk array unit 10 and adapter 23B is released.

That is, in this state, as shown in FIG. 14, adapter 23A is connected with host device 2 by going through first switch 25 and first host-side port 20a1 in this order. Moreover, adapter 23B is connected with disk array unit 10 by going through first switch 25 and first disk-side port 20b1 in this order.

As it has been described above, according to this second exemplary embodiment, even when an in-use switch is in an abnormal state, an adapter and an external apparatus (in this exemplary embodiment, host device 2 or disk array unit 10) are connected via the other switch. As a result, data can be transferred between an adapter and a external apparatus.

The reason is that it is configured that host device 2 and disk array unit 10 can transfer data to and from one of adapters 23A-23F via any one of first switch 25 and second switch 26.

According to the above-mentioned second exemplary embodiment, a period from time when an in-use switch falls in an abnormal state to time when data transfer between both host device 2 and disk array unit 10 becomes normal, can be made short sufficiently.

The reason is because, it is configured that, when one of adapters 23A-23F detects an abnormal state of first switch 25 or second switch 26, the in-use switch is changed to first switch 25 or second switch 26 which is normal.

Moreover, according to the second exemplary embodiment, the same effect as the first exemplary embodiment is achieved.

The reason is that this exemplary embodiment includes the composition of the first exemplary embodiment.

Next, an input/output control unit according to the third exemplary embodiment will be described in detail with reference to FIGS. 1-13 and FIGS. 17-20. In an input/output control unit according to the third exemplary embodiment, an adapter which operates in the spare mode detects that an adapter in the other cluster is in an abnormal state. In addition to that, when it is detected that an adapter in the other cluster is in an abnormal state, an input/output control unit according to the third exemplary embodiment performs data transfer in the other cluster instead of the adapter in the abnormal state. An input/output control unit according to the third exemplary embodiment differs only in a point that it is configured as mentioned above to an input/output control unit according to the second exemplary embodiment. Accordingly, hereinafter, it will be described centering on the point of difference.

Figure 17:
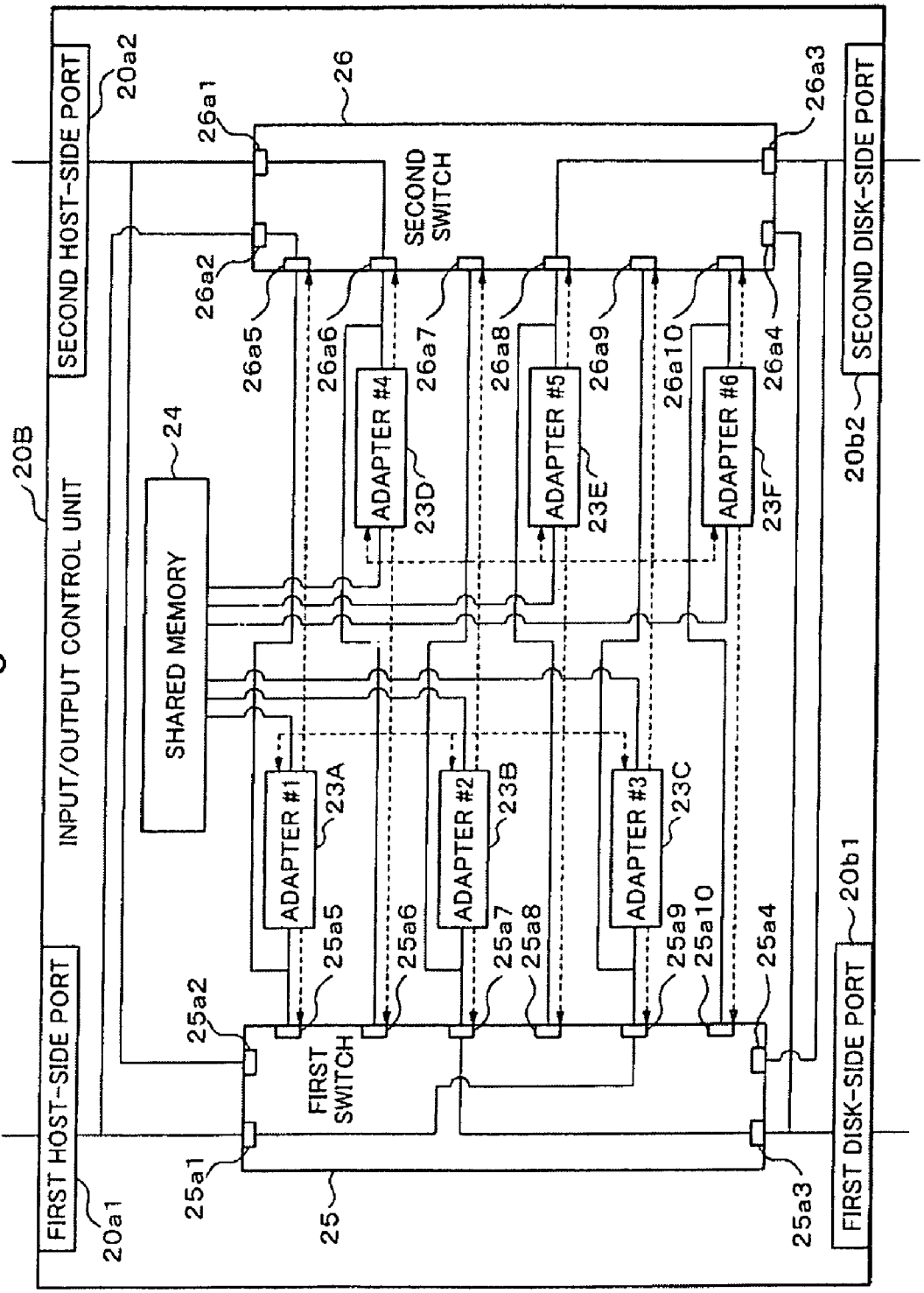
FIG. 17 is a drawing illustrating the schematic configuration of an input/output control unit according to a third exemplary embodiment.

As shown in FIG. 17, each of adapters 23A-23F provided in input/output control unit 20B according to the third exemplary embodiment is connected with each of adapters besides the self-adapter in order to transfer a state confirmation signal and a state response signal to and from all other adapters.

Next, operation of input/output control unit 20B constructed as mentioned above will be described.

Figure 18:
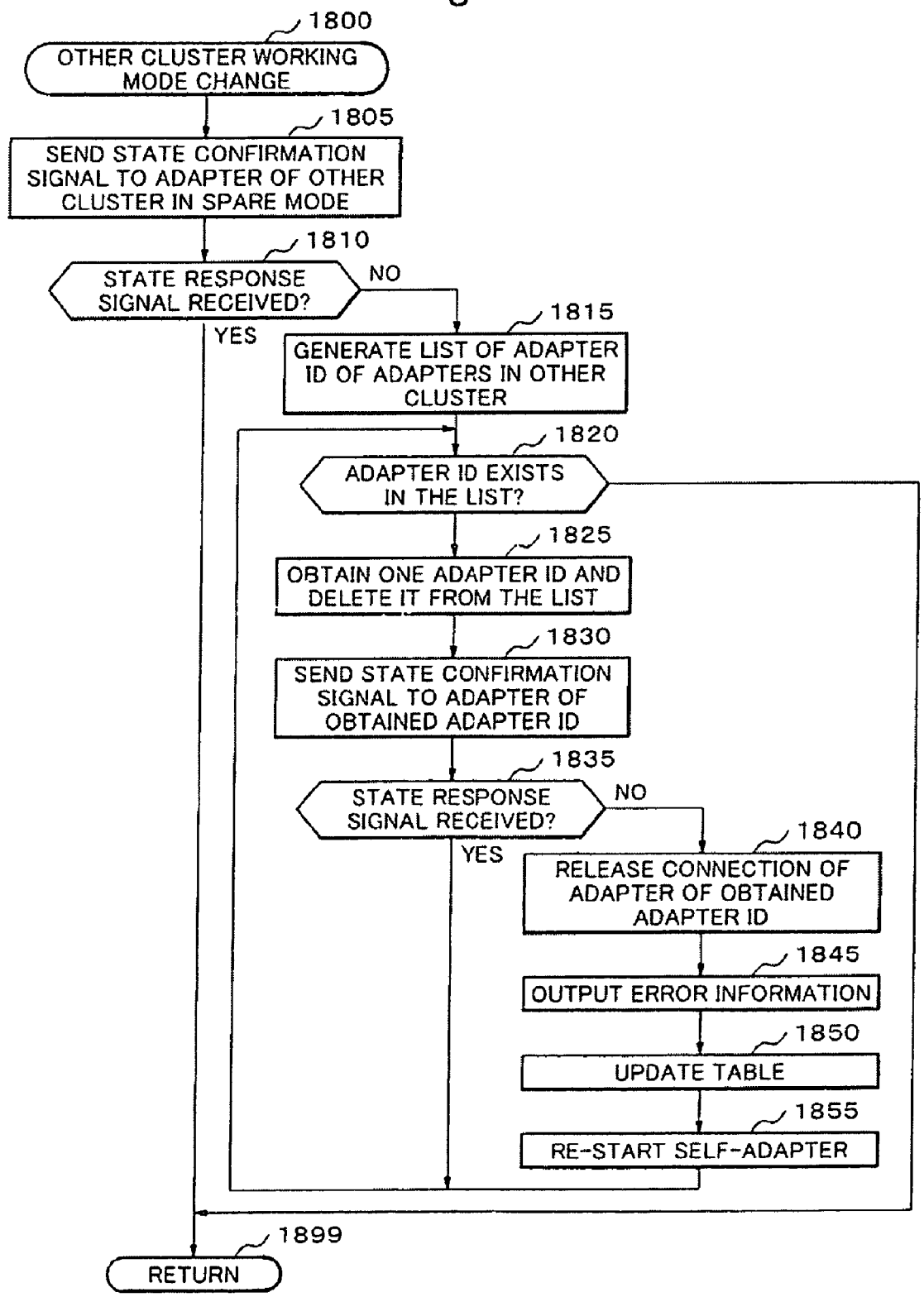
FIG. 18 is a flowchart which indicates operation by an other-cluster-working-mode change program which CPU of the adapter shown in FIG. 17 executes.

An adapter for which a working mode is set to the spare mode among adapters 23A-23F of input/output control unit 20B carries out operation by a other-cluster-working-mode change program shown by the flowchart in FIG. 18 following processing shown by the flowchart of FIG. 9.

Now, assuming a case where each adapters 23A-23F has just been started in the state that adapter attribute information table 241 shown in FIG. 4 is stored in shared memory 24 and all of adapters 23A-23F are normally In operation (they are not in an abnormal state), description will be continued.

In this case, at Step 1805, CPU 23C1 of adapter 23C sends a state confirmation signal to an adapter for which a working mode is set to the spare mode in the other cluster (here, second cluster CL2) (that is, adapter 23F) based on a table read at Step 305.

Next, at Step 1810, CPU 23C1 determines whether a state response signal according to the above-mentioned state confirmation signal is received from above-mentioned adapter 23F during a period after a state confirmation signal is transmitted and until a predetermined waiting time passes.

In this state, when a state confirmation signal is received, adapter 23F transmits a state response signal to adapter 23C which is the sender of the state confirmation signal immediately. Accordingly, CPU 23C1 receives the above-mentioned state response signal from adapter 23F during a period after a state confirmation signal is transmitted and until a predetermined waiting time passes. Accordingly, CPU 23C1 judges as Yes at Step 1810 and advances towards Step 1899 directly, and finishes executing the other-cluster-working-mode change program once.

On the other hand, adapter 23F also begins to execute the other-cluster-working-mode change program. In this state, adapter 23F performs processing of Step 1805 and Step 1810 in turn like a case of adapter 23C, and finishes executing the other-cluster-working-mode change program once.

Next, describing will be continued about a case when only adapter 2 3A is in an abnormal state.

In this case, as mentioned above, by adapter 23C executing a program of FIG. 9, adapter attribute information table 241 stored in shared memory 24 is updated to the table shown in FIG. 10. The connection state of first switch 25 is set to a connection state where adapter 23C and host device 2 is connected and adapter 23B and disk array unit 10.is connected. Moreover, adapter 23C operates in the host mode.

In this state, adapter 23A for which a working mode is set to the spare mode in first cluster CL1 is in an abnormal state. Accordingly, when CPU 23F1 of adapter 23F begins execution of the program of FIG. 18 and advances towards Step 1810, CPU 23F1 does not receive the above-mentioned state response signal from adapter 23A during a period after a state confirmation signal is transmitted to adapter 23A and until a predetermined waiting time passes.

Accordingly, CPU 23F1 judges as No at Step 1810 and advances towards Step 1815. Then, CPU 23F1 creates a list of adapter ID for adapters for which the working mode is set to a working mode besides the spare mode in the other cluster (here, first cluster CL1). That is, the list created in this state includes #2 and #3.

Next, by performing processing of Steps 1820-1835 which is the same processing as Steps 910-925 mentioned above, CPU 23F1 determines whether adapter 23B is ordinarily in operation. In this state, adapter 23B is normally in operation.

Accordingly, CPU 23F1 judges as Yes at Step 1835 and returns to Step 1820, and performs processing of Steps 1820-1835 repeatedly until there is no adapter ID existing in the list any more.

That is, CPU 23F1 confirms that adapter 23C of adapter ID #3 is also normally in operation (that is, a state response signal is transmitted according to the state confirmation signal).

After that, when CPU 23F1 advances towards Step 1820, CPU 23F1 judges as No and advances towards Step 1899 directly, and finishes executing the other-cluster-working-mode change program once.

Next, in this state, description will be continued about a case when adapter 23B becomes also in an abnormal state.

In this case, when CPU 23F1 of adapter 23F begins execution of a program of FIG. 18 and advances towards Step 1835, CPU 23F1 does not receive the above-mentioned state response signal from adapter 23B during a period after a state confirmation signal is transmitted to adapter 23B and until a predetermined waiting time passes.

Accordingly, CPU 23F1 judges as No and advances towards Step 1840, and sends a release instruction signal for releasing a connection between terminal 25a7 with which adapter 23B associated with adapter ID #2 acquired at Step 1825 is connected and terminal 25a3 with which first disk-side port 20b1 is connected to first switch 25. As a result, the connection state of first switch 25 is set to a connection state where a connection between disk array unit 10 and adapter 23B is released.

Then, at Step 1845, CPU 23F1 outputs error information representing that adapter 23B is in an abnormal state (for example, it is written in a log file in shared memory 24).

Next, at Step 915, CPU 23F1 generates adapter attribute information table 241 for update (refer to FIG. 19) in which a working mode and cluster ID associated with adapter ID acquired at Step 1825 (here, adapter ID #2) (that is, here, disk mode and cluster ID #1), and a working mode and cluster ID associated with adapter ID of the self-adapter 23F (here, #6) (that is, here, spare mode, and cluster ID #2) of adapter attribute information table 241 stored in shared memory 24 are exchanged. Moreover, CPU 23F1 replaces adapter attribute information table 241 stored in shared memory 24 with adapter attribute information table 241 for update generated.

Next, CPU 23F1 makes self-adapter 23F restart at Step 1860.

As a result, CPU 23F1 executes the start-up program of FIG. 3. CPU 23F1 reads adapter attribute information table 241 (which is stored in shared memory 24) shown in FIG. 19 at Step 305. Next, CPU 23F1 acquires the disk mode as the working mode of self-adapter 23F at Step 310.

Figure 20:
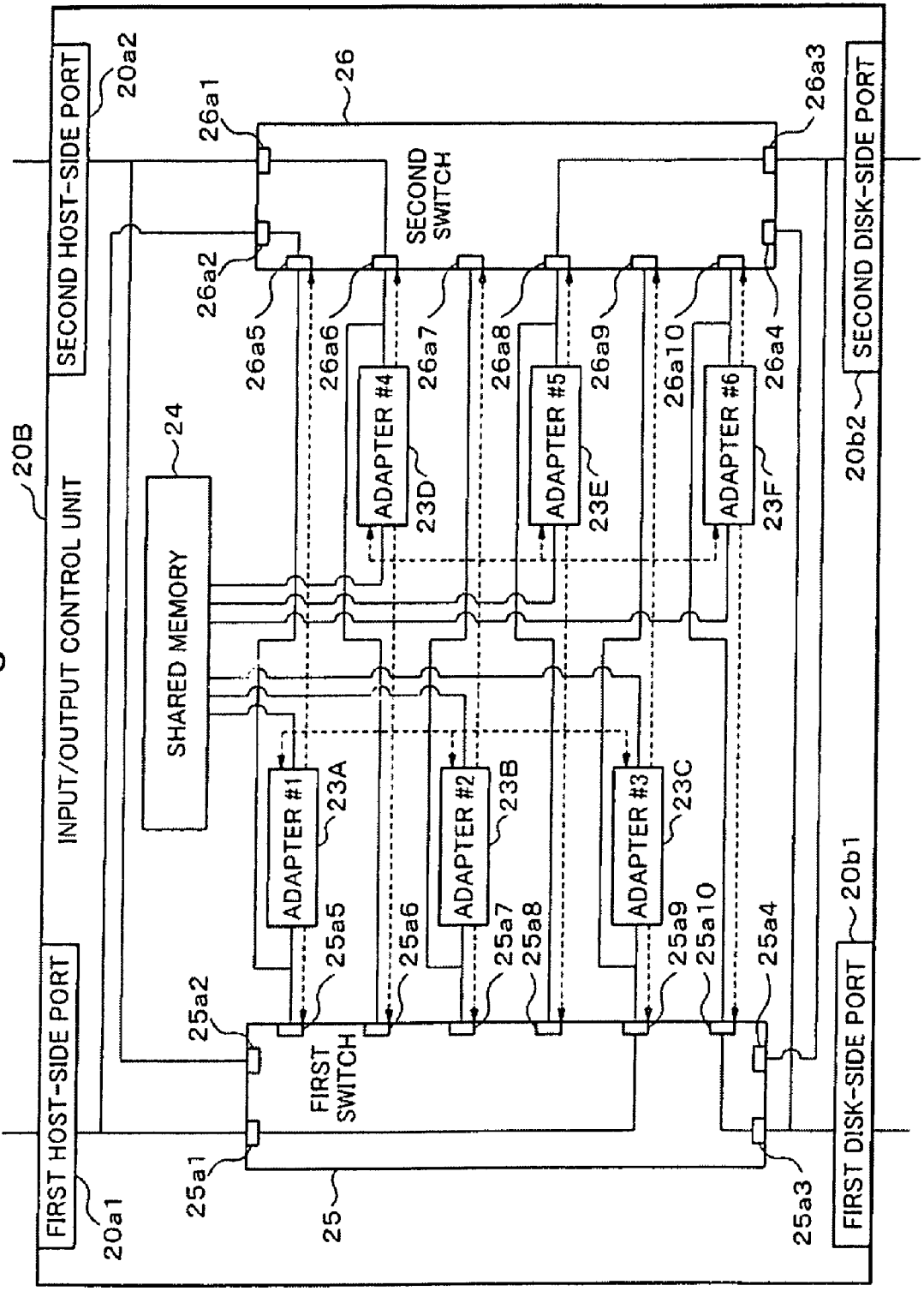
FIG. 20 is a drawing which indicates an input/output control unit in the state that the adapter of the adapter ID #6 is connected with a disk array unit via a first switch and a first disk side port.

After that, CPU 23F1 performs processing of Steps 330-340. As a result, the connection state of first switch 25 is set to a connection state where first disk-side port 20b1 and adapter 23F are connected. That is, in this state, as shown in FIG. 20, first host-side port 20a1 and adapter 23C are connected and first disk-side port 20b1 and adapter 23F are connected (refer to FIG. 20).

Moreover, CPU 23F1 carries out disk-mode program P3 (refer to FIG. 6 and FIG. 8).

In this way, adapter 23F operates in the disk mode in place of adapter 23B which is in an abnormal state.

Further, in the third exemplary embodiment, although input/output control unit 20B is equipped with two adapters which operate in a spare mode, it may be equipped with only one.

Further, the exemplary embodiments are not limited to each of the above-mentioned exemplary embodiments, and various modifications can be adopted in the range of the exemplary embodiments. For example, in each of the above-mentioned exemplary embodiment, although there are two clusters, an input/output control unit may possess one cluster or may possess three or more clusters. Moreover, in each of the exemplary embodiment, although each cluster includes one adapter which operates in the spare mode, it may include a plurality of adapters operating in the spare mode.

Moreover, in each of above-mentioned exemplary embodiment, although it is configured that an adapter which operates in the spare mode detects that an adapter operating in the host mode or the disk mode is in an abnormal state, it may be configured that a unit besides the adapter may perform this detection.

In each of the above-mentioned exemplary embodiment, although it is configured that all adapters can change a working mode according to an adapter attribute information table, it may also possible that a part of adapters is configured to be able to change a working mode, and the others is configured not to be able to change a working mode.

In each of the above-mentioned exemplary embodiment, although external apparatus are two, they may be no smaller than three. Moreover, in each of the above-mentioned exemplary embodiment, although an input/output control unit is configured to control data transfer to and from a disk array unit and a host device, it may also be configured to control data transfer between two external apparatuses. For example, an external apparatus is a hard disk apparatus, a tape device, a terminal device and a host device.

As it has been described above, according to the above-mentioned third exemplary embodiment, even when an adapter which operates in a spare mode does not exist in a cluster including an adapter which has been in an abnormal state, if an adapter which operates in a spare mode exists in the other cluster, the adapter can be used in place of the adapter which has been in an abnormal state.

The reason is that it is configured that host device 2 and disk array unit 10 can transfer data to and from one of adapters 23A-23F via any one of first switch 25 and second switch 26.

As a result, a period from time when an adapter falls in an abnormal state to time when data transfer between both host device 2 and disk array unit 10 becomes normal, can be made short sufficiently.

The reason is that adapters 23A-23F are configured to detect an abnormal state of adapters 23A-23F mutually.

Moreover, the number of spare adapters (that is, of purpose for securing redundancy) can be reduced more than a case where two adapters of a spare adapter (input/output unit) for transferring data to and from host device 2 and a spare adapter for transferring data to and from disk array unit 10 are prepared.

The reason is that adapter 23C and adapter 23F is configured to be able to change their working mode into any of working modes of adapter 23A, adapter 23B, adapter 23D and adapter 23E.

Next, the fourth exemplary embodiment will be described in detail with reference to FIG. 21.

Figure 21:
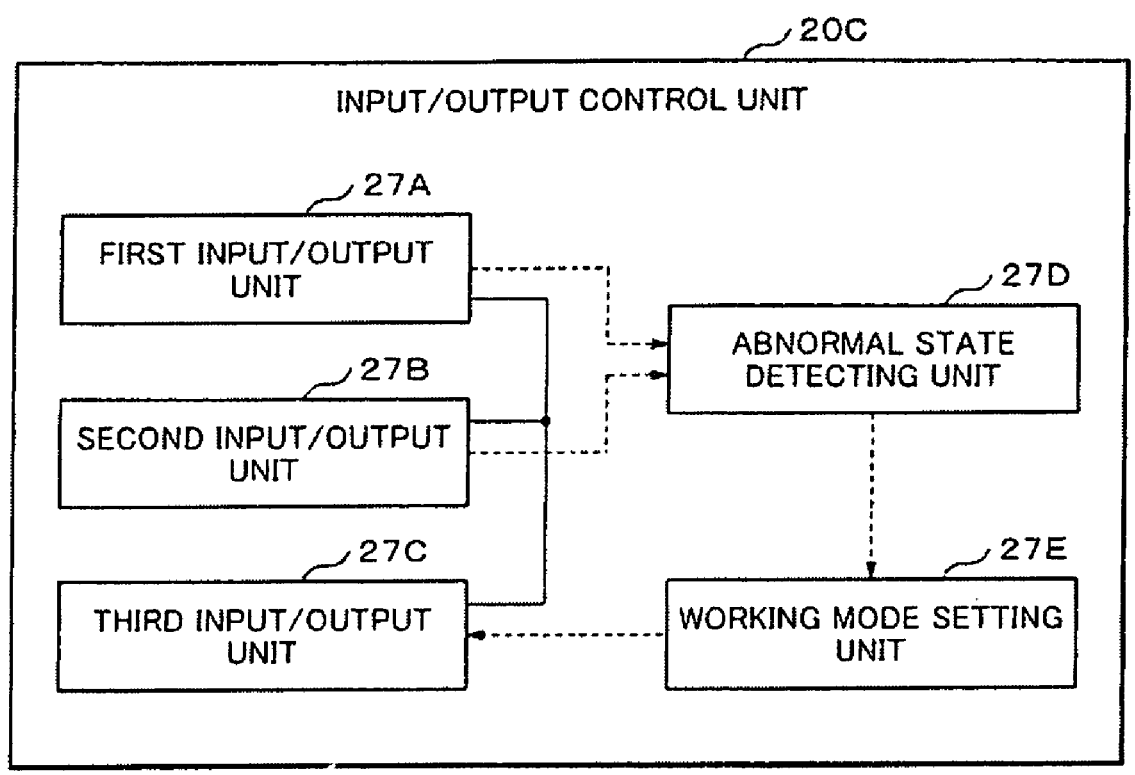
FIG. 21 is a drawing illustrating the schematic configuration of an input/output control unit according to a fourth exemplary embodiment.

As shown in FIG. 21, an input/output control unit 20C according to the fourth exemplary embodiment includes first input/output unit 27A, second input/output unit 27B, third input/output unit 27C, abnormal state detecting unit 27D and working mode setting unit 27E.

First input/output unit 27A sends and receives data to and from a first external apparatus.

Second input/output unit 27B sends and receives data to and from a second external apparatus.

Third input/output unit 27C is in one of a plurality of working modes including a first working mode for sending and receiving data to and from the first external apparatus and a second working mode for sending and receiving data to and from the second external apparatus.

Abnormal state detecting unit 27D detects that first input/output unit 27A or the second input/output unit is in an abnormal state.

When it is detected by abnormal state detecting unit 27D that first input/output unit 27A is in an abnormal state, working mode setting unit 27E makes third input/output unit 27C operate in the first working mode. When it is detected by abnormal state detecting unit 27D that second input/output unit 27B is in an abnormal state, working mode setting unit 27E makes the working mode of third input/output unit 27C operate in the second working mode.

As it has been described above, according to the above-mentioned fourth exemplary embodiment, an issue that a cost performance ratio of an input/output unit which is provided in order to secure redundancy is low can be settled.

The reason is that the working mode of third input/output unit 27C can be set to any one of first input/output unit 27A and second input/output unit 27B, when it is detected that first input/output unit 27A or second input/output unit 27B is in an abnormal state.

Next, the fifth exemplary embodiment will be described in detail with reference to FIG. 17 and FIG. 22.

Figure 22:
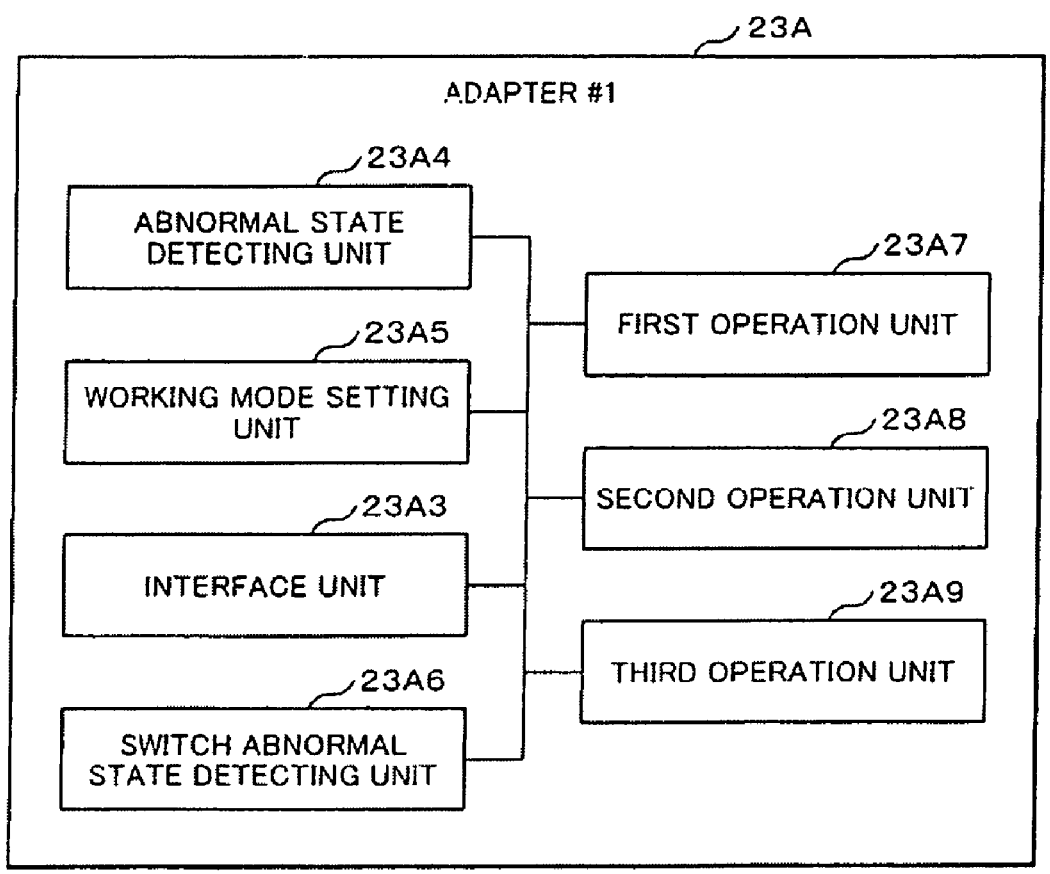
FIG. 22 is a drawing illustrating the schematic configuration of an input/output control unit according to a fifth exemplary embodiment.

As shown in FIG. 22, adapter 23A according to the fifth exemplary embodiment includes interface unit 23A3, first operation unit 23A7, second operation unit 23A8, third operation unit 23A9, abnormal state detecting unit 23A4, switch abnormal state detecting unit 23A6 and working mode setting unit 23A5.

As shown in FIG. 17, interface unit 23A3 of adapter 23A is connected with each of terminal 25a5 of first switch 25, terminal 26a5 of second switch 26, shared memory 24 and adapter 23B-adapter 23F. The interface unit 23A3 sends and receives data (including an instruction signal, request information and instruction information and the like) to and from each of above mentioned connections.

First operation unit 23A7 performs operation of the host mode (it is also generally called a first working mode) in adapter 23A. Operation of the host mode is similar to operation which has been explained in the exemplary embodiment of the first to third exemplary embodiment.

Second operation unit 23A8 performs operation of the disk mode (it is also generally called a second working mode) of adapter 23A. Operation of the disk mode is similar to the operation which has been explained in the first to third exemplary embodiment.

Third operation module 23A9 performs operation of the spare mode (it is also generally called a third working mode) of adapter 23A. Operation of the spare mode is similar to the operation described in the second exemplary embodiment.

when adapter 23A is in operation in the spare mode, abnormal state detecting unit 23A4 detects that adapter 23B-adapter 23F is in an abnormal state.

When adapter 23A is in operation in the host mode or disk mode, switch abnormal state detecting unit 23A6 detects that first switch 25 or second switch 26 which is being used is in an abnormal state.

When adapter 23A is in operation in a spare mode, when abnormal state detecting unit 23A4 detects that one adapter among adapter 23B-adapter 23F is in the first working mode or the second working mode and in an abnormal state, working mode setting unit 23A5 arranges such that adapter 23A shifts to the working mode of the one of adapter 23B-adapter 23F which is in an abnormal state.

When adapter 23A is in operation in the host mode or disk mode, when it is detected that first switch 25 or second switch 26 which switch abnormal state detecting unit 23A6 is using is in an abnormal state, working mode setting unit 23A5 arranges such that a switch in the normal state is selected for use out of first switch 25 or second switch 26.

As it has been described above, according to the above-mentioned fifth exemplary embodiment, redundancy can also be secured for a failure of a switch.

The reason is that it is arranged that a switch in an abnormal state can be detected and a switch in the normal state can be used.

The sixth exemplary embodiment of the invention is an input/output control unit which receives data from one of a first external apparatus and a second external apparatus, and sends the data received to the other of the first external apparatus and the second external apparatus.

Moreover, this input/output control unit includes:

a first input/output unit that sends and receives the data to and from the first external apparatus;

a second input/output unit that sends and receives the data to and from the second external apparatus;

a third input/output unit capable of setting a working mode to one of a plurality of working modes including a first working mode for transferring the data to and from the first external apparatus and a second working mode for transferring the data to and from the second external apparatus;

an abnormal state detecting means which detects that the first input/output unit or the second input/output unit is in an abnormal state; and a working mode setting means which sets the working mode of the third input/output unit to the first working mode when it is detected by the abnormal state detecting means that the first input/output unit is in an abnormal state, and on the other hand, when it is detected by the abnormal state detecting means that the second input/output unit is in an abnormal state, the working mode of the third input/output unit is set to the second working mode.

According to this, when first input/output unit is in an abnormal state, the working mode of the third input/output unit is set to a first working mode in which data is transferred to and from Die first external apparatus. On the other hand, when the second input/output unit is in an abnormal state, the working mode of the third input/output unit is set to the second working mode in which data is transferred to and from the second external apparatus.

As a result, the third input/output unit can transfer data to and from the external apparatus which has been transferring data to and from the input/output unit which is in an abnormal state. As a result, a period from time when an input/output control unit falls in an abnormal state to time when data transfer to and from both first external apparatus and second external apparatus becomes normal, can be made short sufficiently.

Moreover, the number of the spare input/output unit (that is, for securing redundancy) can be reduced compared to a case where two input/output units as a spare input/output unit for transferring data to and from the first external apparatus and a spare input/output unit for transferring data to and from the second external apparatus are prepared.

In the seventh exemplary embodiment of the invention, the above-mentioned plurality of working modes include a third working mode that detects that the first input/output unit or the second input/output unit is in an abnormal state.

The above-mentioned abnormal state detecting means includes the third input/output unit that operates in the third working mode.

According to this, while the third input/output unit is in operation in the third working mode, the third input/output unit detects that the first input/output unit or the second input/output unit is in an abnormal state. Accordingly, the production cost of an input/output control unit can be reduced, because an apparatus which detects an abnormal state of the first input/output unit or the second input/output unit does not need to be installed separately.

In the eighth exemplary embodiment of the invention, the working mode setting means:

includes a switch capable of setting a connection state to one of a plurality of connection states including a first connection state for connecting the third input/output unit and the first external apparatus and a second connection state for connecting the third input/output unit and the second external apparatus, and is configured to set the working mode of the third input/output unit to the first working mode by setting the connection state of the above-mentioned switch to the first connection state, and on the other hand, set the working mode of the third input/output unit to the second working mode by setting the connection state of the switch to the second connection state.

In the ninth exemplary embodiment the working mode setting means is configured to change the working mode of the third input/output unit by changing processing carried out by the third input/output unit at start-up, and to restart the third input/output unit when the first input/output unit or the second input/output unit is in an abnormal state.

In the tenth exemplary embodiment of the invention, the above-mentioned first input/output unit is configured to transfer the data to and from the first external apparatus by being connected with the first external apparatus via the switch;

the above-mentioned input/output unit is configured to transfer the data to and from the second external apparatus by being connected with the second external apparatus via the switch;

the first connection state is a state in which a connection between the first input/output unit and the first external apparatus is released, and the third input/output unit and first external apparatus are connected; and the second connection state is a state in which a connection between the second input/output unit and the second external apparatus is released, and the third input/output unit and second external apparatus are connected.

According to this, when the first input/output unit is in an abnormal state, a connection between first input/output unit and the first external apparatus is released, and on the other hand, when the second input/output unit is in an abnormal state, a connection between the second input/output unit and the second external apparatus is released. Accordingly, data transfer between the third input/output unit connected newly and an external apparatus (the first external apparatus or the second external apparatus) can be performed more reliably.

In the eleventh exemplary embodiment of the invention, the above-mentioned working mode setting means includes: a plurality of the switches;

a switch abnormal state detecting means which detects that an in-use switch which is one of the plurality of switches is in an abnormal state; and a switch change means which connects, when it is detected by the switch abnormal state detecting means that the in-use switch is in an abnormal state, the input/output means and the external apparatus which are connected via the in-use switch via a switch besides the in-use switch among the plurality of switches.

According to this, even when an in-use switch is in an abnormal state, an input/output unit and an external apparatus are connected via the other switch. As a result, data can be transferred between the input/output unit and the external apparatus. Accordingly, a period from time when an in-use switch falls in an abnormal state to time when normal data transfer to and from both the first external apparatus and second external apparatus becomes available, can be made short sufficiently.

In an twelfth exemplary embodiment of the invention, the above-mentioned first external apparatus is a host device which sends write data as the above-mentioned data to the second external apparatus and receives read data as the data from the second external apparatus, and the second external apparatus is a disk array unit which stores the write data from the first external apparatus, and sends the stored write data to the first external apparatus as the read data.

A disk array unit and a host device which transfer data each other often keep operating. Accordingly, by employing an input/output control unit mentioned above as an apparatus which controls transfer of data between the disk array unit and the host device, data transfer between the disk array unit and the host device can be performed reliably.

A thirtieth exemplary embodiment of the invention is a disk array apparatus which includes a disk array unit storing write data and outputting the stored write data as read data, and which receives data from either a host device which outputs the write data and inputs the read data or the disk array unit, and sends the data received to the other of the host device and the disk array unit.

Moreover, this disk array apparatus includes:

a first input/output unit that sends and receives data to and from the disk array unit;

a second input/output unit that sends and receives the data to and from the host device;

a third input/output unit capable of setting a working mode to one of a plurality of working modes including a first working mode for transferring the data to and from the disk array unit and a second working mode for transferring the data to and from the host device;

an abnormal state detecting means which detects that the first input/output unit or the second input/output unit is in an abnormal state;

a working mode setting unit which sets the working mode of the third input/output unit to the first working mode when it is detected by the abnormal state detecting unit that the first input/output unit is in an abnormal state, and sets the working mode of the third input/output unit to the second working mode when it is detected by the abnormal state detecting unit that the second input/output unit is in an abnormal state.

In a fortieth exemplary embodiment, the plurality of working modes further includes a third working mode for detecting that the first input/output unit or the second input/output unit is in an abnormal state, and the abnormal state detecting unit further includes the third input/output unit that operates in the third working mode.

In a fiftieth exemplary embodiment of the invention, the working mode setting means:

includes a switch capable of setting a connection state to one of a plurality of connection states including a first connection state for connecting the third input/output unit and the disk array unit and a second connection state for connecting the third input/output unit and the host device; and is configured to set the working mode of the third input/output unit to the first working mode by setting the connection state of the above-mentioned switch to the first connection state, and on the other hand, set the working mode of the third input/output unit to the second working mode by setting the connection state of the switch to the second connection state.

In a sixtieth exemplary embodiment, the working mode setting means is configured to change the working mode of the third input/output unit by changing processing carried out by the third input/output unit at start-up, and to restart the third input/output unit, when the first input/output unit or the second input/output unit is in an abnormal state.

A seventieth exemplary embodiment of the invention is an input/output control method for:

controlling an input/output control unit which includes a first input/output unit which sends and receives data to and from a first external apparatus and a second input/output unit which sends and receives data to and from a second external apparatus, and which receives data from one of the first external apparatus and the second external apparatus, and sends the data received to the other of the first external apparatus and the second external apparatus.

Moreover, this input/output control method includes:

an abnormal state detecting step for detecting that the first input/output unit or the second input/output unit is in an abnormal state; and a working mode setting step for setting a working mode of the third input/output unit to a first working mode in which the data is transferred to and from the first external apparatus, when it is detected that the first input/output unit is in an abnormal state, and for setting the working mode of the third input/output unit to a second working mode in which the data is transferred to and from the second external apparatus, when it is detected by the abnormal state detecting step that the second input/output unit is in an abnormal state.

In a eighteenth exemplary embodiment of the invention, It is suitable that the above-mentioned working mode setting step includes a step for setting the third input/output unit to a third working mode in which it is detected that the first input/output unit or the second input/output unit is in an abnormal state.

Because even exemplary embodiments of a disk array apparatus and an input/output control method including aforementioned configurations can achieve the object of the present invention mentioned above, because they include the same effect as the above-mentioned input/output control unit.

An input/output control unit described in the above-mentioned patent document 1 needs to be equipped with at least two spares of the input/output units in order to secure redundancy.

However, when an apparatus like an input/output control unit described in patent document 1 is used in an appropriate operational environment and a maintenance environment, the probability that a double failure occurs to the input/output control unit and two of the spare input/output units are used together is generally small.

That is, in an input/output control unit described in patent document 1, there is a problem that a cost performance ratio of an input/output unit which is provided in order to secure redundancy is low.

The exemplary embodiments described above are applicable in a disk array apparatus including a plurality of hard disk drives.

An exemplary advantage according to the invention is that the number of input/output units for securing redundancy can be reduced.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents. Further. It is noted that the inventor's intent is to retain all equivalents of the claimed invention even if the claims are amended during prosecution.

What is claimed is:

1. An input/output controller comprising:
a first input/output unit that sends and receives data to and from a first external apparatus;
a second input/output unit that sends and receives data to and from a second external apparatus;
a third input/output unit that operates in one of a plurality of working modes including a first working mode for sending and receiving data to and from said first external apparatus and a second working mode for sending and receiving data to and from said second external apparatus;
an abnormal state detecting unit which detects that said first input/output unit or said second input/output unit is in an abnormal state;
a shared memory that stores a table which includes a plurality of adapter attribute information including input/output unit ID that identifies said input/output unit, and a working mode of said input/output unit; and
a working mode setting unit that exchanges said working mode of said third input/output unit stored in said table for said working mode of said first input/output unit stored in said table when it is detected by said abnormal state detecting unit that said first input/output unit is in an abnormal state, and exchanges said working mode of said third input/output unit stored in said table for said working mode of said second input/output unit stored in said table when it is detected by said abnormal state detecting unit that said second input/output unit is an abnormal state, wherein said third input/output unit reads said exchanged working mode included in said adapter attribute information including said input/output unit ID of said third input/output unit and operates in said read working mode when it is detected by said abnormal state detecting unit that said first input/output unit or said second input/output unit is in an abnormal state, and each of said first input/output unit and said second input/output unit reads said exchanged working mode included in said adapter attribute information including said input/output unit ID of each of said first input/output unit and said second input/output unit and operates in said read working mode when each of said first input/output unit and said second input/output unit is activated.

2. The input/output controller according to claim 1;
wherein said plurality of working modes further includes a third working mode for detecting that said first input/output unit or said second input/output unit is in an abnormal state, and
said third input/output unit operates in said third working mode.

3. The input/output controller according to claim 1,
wherein said working mode setting unit further includes a switch capable of assuming one of a plurality of connection states including a first connection state for connecting said third input/output unit and said first external apparatus and a second connection state for connecting said third input/output unit and said second external apparatus, and
said third input/output unit directs said switch to assume said first connection state, or directs said switch to assume said second connection state.

4. The input/output controller according to claim 1,
wherein said third input/output unit reads said working mode included in said adapter attribute information including said input/output unit ID of said third input/output unit and operates in said read working mode at the start-up, and restarts itself when said first input/output unit or said second input/output unit is in an abnormal state.

5. The input/output controller according to claim 3,
wherein said first input/output unit sends and receives data to and from said first external apparatus by being connected with said first external apparatus via said switch;
said second input/output unit sends and receives data to and from said second external apparatus by being connected with said second external apparatus via said switch;
said first connection state is a state in which the connection between said first input/output unit and said first external apparatus is released, and said third input/output unit and first external apparatus are connected; and
said second connection state is a state in which the connection between said second input/output unit and said second external apparatus is released, and said third input/output unit and second external apparatus are connected.

6. The input/output controller according to claim 3 further comprising;
a plurality of said switches;
a switch abnormal state detecting unit which detects that an in-use switch which is one of said a plurality of switches is in an abnormal state; and a switch change unit which connects said input/output unit and said external apparatus, which have been connected by said in-use switch, via a switch besides said in-use switch out of said plurality of switches, when it is detected by said switch abnormal state detecting unit that said in-use switch is in an abnormal state.

7. The input/output controller according to claim 1,
wherein said first external apparatus is a host device which sends write data to said second external apparatus and which receives read data from said second external apparatus, and
said second external apparatus is a disk array unit which stores said write data from said first external apparatus and which sends data stored therein to said first external apparatus as said read data.

8. A disk array apparatus comprising:
a first input/output unit that sends and receives data to and from a disk array unit;
a second input/output unit that sends and receives data to and from a host device;
a third input/output unit that operates in one of a plurality of working modes including a first working mode for sending and receiving data to and from said disk array unit and a second working mode for sending and receiving data to and from said host device;
an abnormal state detecting unit which detects that said first input/output unit or said second input/output unit is in an abnormal state;
a shared memory that stores a table which includes a plurality of adapter attribute information including input/output unit ID identifying said input/output unit, and a working mode of said input/output unit; and
a working mode setting unit which exchanges said working mode of the third input/output unit stored in said table for said working mode of said first input/output unit stored in said table when it is detected by said abnormal state detecting unit that said first input/output unit is in an abnormal state, and exchanges said working mode of said third input/output unit stored in said table for said working mode of said second input/output unit stored in said table when it is detected by said abnormal state detecting unit that said second input/output unit is an abnormal state, wherein
said third input/output unit reads said exchanged working mode included in said adapter attribute information including said input/output unit ID of said third input/output unit and operates in said read working mode when it is detected by said abnormal state detecting unit that said first input/output unit or said second input/output unit is in an abnormal state, and
each of said first input/output unit and said second input/output unit reads said exchanged working mode included in said adapter attribute information including said input/output unit ID of each of said first input/output unit and said second input/output unit and operates in said read working mode when each of said first input/output unit and said second input/output unit is activated.

9. The disk array apparatus according to claim 8, wherein said plurality of working modes includes:
a third working mode for detecting that said first input/output unit or said second input/output unit is in an abnormal state, and
said third input/output unit operates in said third working mode.

10. The disk array apparatus according to claim 8, wherein said working mode setting unit includes:
a switch capable of assuming one of a plurality of connection states including a first connection state in which said third input/output unit and said disk array unit are connected and a second connection state in which said third input/output unit and said host device are connected, and
said third input/output unit directs said switch to assume said first connection state, or directs said switch to assume said second connection state.

11. A disk array apparatus according to claim 8,
wherein said third input/output unit reads said working mode included in said adapter attribute information including said input/output unit ID of said third input/output unit and operates in said read working mode at the start-up, and restarts itself when said first input/output unit or said second input/output unit is in an abnormal state.

12. An input/output control method for controlling an input/output control unit which includes a first input/output unit that sends and receives data to and from a first external apparatus and a second input/output unit that sends and receives data to and from a second external apparatus, and which receives data from one of said first external apparatus and said second external apparatus, and sends the data received to the other of the first external apparatus and the second external apparatus, comprising:
detecting that said first input/output unit or said second input/output unit is in an abnormal state;
exchanging a working mode of a third input/output unit stored in a shared memory that stores a table which includes a plurality of adapter attribute information including input/output unit ID identifying said input/output unit, and a working mode of said input/output unit for said working mode of said first input/output unit stored in said table, when it is detected that said first input/output unit is in an abnormal state;
exchanging a working mode of said third input/output unit stored in a shared memory that stores a table which includes a plurality of adapter attribute information including input/output unit ID identifying said input/output unit, and a working mode of said input/output unit for said working mode of said input/output unit for second input/output unit stored in said table, when it is detected that said second input/output unit is in an abnormal state;
reading said exchanged working mode included in said adapter attribute information including said input/output unit ID of said third input/output unit and making said third input/out unit operate in said read working mode when it is detected that said first input/output unit or said second input/output nit is in an abnormal state; and
reading said exchanged working mode included in said adapter attribute information including said input/output unit ID of each of said first input/output unit and said second input/output unit and making each of said first input/output unit and said second input/output unit operate in said read working mode when each of said first input/output unit and said second input/output unit is activated.

13. The input/output control method according to claim 12, further comprising:
making said third input/output unit operate in a third working mode in which it is detected that said first input/output unit or said second input/output unit is in an abnormal state.

14. The input/output control method according to claim 12, further comprising:
directing a switch, capable of assuming one of a plurality of connection states including a first connection state in which said third input/output unit and said first external apparatus are connected and a second connection state in which said third input/output unit and said second external apparatus are connected, to assume said second connection state or said first connection state.

15. The input/output control method according to claim 12, further comprising:
making said third input/output unit operate in said read working mode;
making said third input/output unit restart, when said first input/output unit or said second input/output unit is in an abnormal state; and
reading said exchanged working mode included in said adapter attribute information including said input/output unit ID of said third input/output unit and making said third input/out unit operate in said read working mode.

16. The input/output control method according to claim 14, wherein
said first connection state includes the release of the connection between said first input/output unit and said first external apparatus;
said second connection state includes the release of the connection between said second input/output unit and said second external apparatus.

17. The input/output control method according to claim 14, further comprising:
detecting that an in-use switch which is one of a plurality of said switches is in an abnormal state;
connecting said input/output unit and said external apparatus, which have been connected via said in-use switch, via a switch besides said in-use switch out of a plurality of said switches, when it is detected that said in-use switch is in an abnormal state.

18. A non-transitory computer readable medium recording thereon a program, said program causing an input/output control unit which includes a first input/output unit that sends and receives data to and from a first external apparatus and a second input/output unit that sends and receives data to and from a second external apparatus, and which receives data from one of said first external apparatus and said second external apparatus, and sends the data received to the other of the first external apparatus and the second external apparatus to perform a method, said method comprising:
detecting that said first input/output unit or said second input/output unit is in an abnormal state;
exchanging a working mode of a third input/output unit stored in a shared memory that stores a table which includes a plurality of adapter attribute information including input/output unit ID identifying said input/output unit, and a working mode of said input/output unit for said working mode of said first input/output unit stored in said table, when it is detected that said first input/output unit is in an abnormal state;
exchanging a working mode of said third input/output unit stored in a shared memory that stores a table which includes a plurality of adapter attribute information including input/output unit ID identifying said input/output unit, and a working mode of said input/output unit for said working mode of said input/output unit for second input/output unit stored in said table, when it is detected that said second input/output unit is in an abnormal state;

reading said exchanged working mode included in said adapter attribute information including said input/output unit ID of said third input/output unit and making said third input/out unit operate in said read working mode when it is detected that said first input/output unit or said second input/output unit is in an abnormal state; and reading said exchanged working mode included in said adapter attribute information including said input/output unit ID of each of said first input/output unit and said second input/output unit and making each of said first input/output unit and said second input/output unit operate in said read working mode when each of said first input/output unit and said second input/output unit is activated.

19. The non-transitory computer readable medium according to claim 18, said method further comprising:
making said third input/output unit operate in a third working mode in which it is detected that said first input/output unit or said second input/output unit is in an abnormal state.

20. The non-transitory computer readable medium according to claim 18, said method further comprising:
directing a switch, capable of assuming one of a plurality of connection states including a first connection state in which said third input/output unit and said first external apparatus are connected and a second connection state in which said third input/output unit and said second external apparatus are connected to assume said second connection state or said first connection state.

21. The non-transitory computer readable medium according to claim 18, said method further comprising:
making said third input/output unit operate in said read working mode;
making said third input/output unit restart, when said first input/output unit or said second input/output unit is in an abnormal state; and
reading said exchanged working mode included in said adapter attribute information including said input/output unit ID of said third input/output unit and making said third input/out unit operate in said read working mode.

22. The non-transitory computer readable medium according to claim 20, wherein
said first connection state includes the release of the connection between said first input/output unit and said first external apparatus;
said second connection state includes the release of the connection between said second input/output unit and said second external apparatus.

23. The non-transitory computer readable medium according to claim 20, said method further comprising:
detecting that an in-use switch which is one of a plurality of said switches is in an abnormal state;
connecting said input/output unit and said external apparatus, which have been connected via said in-use switch, via a switch besides said in-use switch out of a plurality of said switches, when it is detected that said in-use switch is in an abnormal state.

24. An input/output controller comprising:
a first input/output means for sending and receiving data to and from a first external apparatus;
a second input/output means for sending and receiving data to and from a second external apparatus;
a third input/output means for operating in one of a plurality of working modes including a first working mode for sending and receiving data to and from said first external apparatus and a second working mode for sending and receiving data to and from said second external apparatus;
an abnormal state detecting means for detecting that said first input/output means or said second input/output means is in an abnormal state;
a shared memory means for storing a table which includes a plurality of adapter attribute information including input/output means ID that identifies said input/output means, and a working mode of said input/output means; and
a working mode setting means for exchanging said working mode of said third input/output means stored in said table for said working mode of said first input/output means stored in said table when it is detected by said abnormal state detecting means that said first input/out means is in an abnormal state,and exchanges said working mode of said third input/output means stored in said table for said working mode of said second input/out means stored in said table when it is detected by said abnormal state detecting means that said second input/output means is an abnormal state, wherein
said third input/out means reads said exchanged working mode included in said adapter attribute information including said input/output means ID of said third input/output means and operates in said read working mode when it is detected by said abnormal state detecting means that said first input/output means or said second input/output means is in an abnormal state, and
each of said first input/output means and said second input/output means reads said exchanged working mode included in said adapter attribute information including said input/output means ID of each of said first input/output means and said second input/output means and operates in said read working mode when each of said first input/output means and said second input/output means is activated.

* * * * *